(12) United States Patent
Azuma et al.

(10) Patent No.: US 6,720,675 B2
(45) Date of Patent: Apr. 13, 2004

(54) POWER CONVERTER

(75) Inventors: Satoshi Azuma, Tokyo (JP); Kazunori Sanada, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/275,389

(22) PCT Filed: Mar. 30, 2001

(86) PCT No.: PCT/JP01/02789
§ 371 (c)(1),
(2), (4) Date: Nov. 5, 2002

(87) PCT Pub. No.: WO02/082627
PCT Pub. Date: Oct. 17, 2002

(65) Prior Publication Data
US 2003/0128561 A1 Jul. 10, 2003

(51) Int. Cl.[7] .......................... H02J 1/00; H02M 7/537
(52) U.S. Cl. ........................ 307/85; 307/82; 363/65
(58) Field of Search .......................... 363/65, 68, 69, 363/71; 323/267; 307/64, 66, 71, 80, 82, 85, 86

(56) References Cited

U.S. PATENT DOCUMENTS

| | | | | | |
|---|---|---|---|---|---|
| 5,418,707 | A | * | 5/1995 | Shimer et al. | 363/65 |
| 5,446,645 | A | * | 8/1995 | Shirahama et al. | 363/71 |
| 6,104,624 | A | * | 8/2000 | Iwamoto et al. | 363/71 |

FOREIGN PATENT DOCUMENTS

| | | |
|---|---|---|
| JP | 5-308777 | 11/1993 |
| JP | 4-158798 | 12/1993 |
| JP | 7-59360 | 3/1995 |
| JP | 10-191641 | 7/1998 |
| JP | 11-215705 | 8/1999 |
| JP | 2000-278954 | 10/2000 |

* cited by examiner

Primary Examiner—Jessica Han
(74) Attorney, Agent, or Firm—Leydig, Voit & Mayer, Ltd.

(57) ABSTRACT

A power conversion apparatus includes AC power supplies, If an abnormality occurs in any one of the AC power supplies and loads that are respectively connected to two capacitors are not balanced, voltages of the two capacitors are balanced. When an abnormality occurs in a first or second AC power supply, a first reactor is connected to a second reactor in series, a battery supplies energy to the two capacitors, and a current flowing to the first reactor is controlled by a first switch. In this manner, a voltage between the two capacitors is controlled.

3 Claims, 23 Drawing Sheets

POWER CONVERTER

TECHNICAL FIELD

The present invention relates to a power conversion apparatus such as an uninterruptible power supply that is capable of supplying power to a load even if an abnormality, such as a power failure or a momentary voltage drop, occurs in a system power supply. More particularly, the present invention relates to an apparatus having a function of coping with unbalanced loads.

BACKGROUND ART

A conventional AC/DC conversion apparatus disclosed in JP Patent No. 2765372 is shown in FIG. 24. In this drawing, reference numeral 100 denotes an AC power supply, numeral 101 a switch means, numeral 102 a reactor, numerals 103 and 104 transistors, numerals 105 and 106 diodes, numerals 107 and 108 capacitors, numerals 109 and 110 resistors functioning as DC loads, and numeral 111 a battery.

In the apparatus constructed in this manner, in the case where the AC power supply 100 operates normally, the switch means 101 is connected to a contact point A and the transistors 103 and 104 are alternately turned on/off. As a result, a current of the reactor 102 is controlled so that the power factor of a current flowing to the AC power supply 100 becomes one, and the capacitors 107 and 108 are charged. Also, the charged energy is supplied to each of the resistors 109 and 110.

Also, in the case where an abnormality, such as a power failure, occurs in the AC power supply 100, energy is supplied from the battery 111 to the resistors 109 and 110. During this operation, in the case where the resistors 109 and 110 have the same resistance value, that is, in the case where these resistors consume the same amount of power, the amount of energy supplied from the capacitor 107 to the resistor 109 becomes the same as that supplied from the capacitor 108 to the resistor 110. As a result, the voltages of the capacitors 107 and 108 become equal to each other at all times. That is, the voltage values of the capacitors 107 and 108 are balanced by the energy supplied from the battery 111.

However, in the case of unbalanced loads where values of the resistors 107 and 108 differ from each other, for instance, voltages values of the capacitors 107 and 108 are unbalanced. This is because only the battery 111 charges the two capacitors 107 and 108 and it becomes impossible to control the potential at an interconnection point C between the capacitors 107 and 108.

Even if the AC power supply operates normally, in the case of such unbalanced loads, an imbalance occurs. However, for instance, JP Laid-Open No. 2000-278954 discloses a technique of eliminating imbalance by changing the ratio between on/off times during the switching of the transistors 103 and 104 using an unillustrated control circuit.

By the way, if an abnormality like a power failure occurs in the AC power supply 100 and the voltages of the capacitors 107 and 108 are unbalanced, there occurs a problem that desired voltages are not applied to the loads 109 and 110. That is, in the case of unbalanced loads where the value of the resistor 110 is smaller than the value of the resistor 109, for instance, the voltage of the capacitor 108 ultimately becomes zero and the voltage of the capacitor 107 becomes VB.

In view of this problem, with the conventional technique disclosed in the above-mentioned publication, in the case where an abnormality like a power failure occurs in the AC power supply 100, the switch means 101 is switched to a contact point B. Also, to stabilize the potential at the interconnection point C, the current of the reactor 102 is controlled by performing the switching of the transistors 103 and 104 using an unillustrated control circuit. As a result of this operation, the voltages of the two capacitors 107 and 108 become equal to each other at all times even in the case of the unbalanced loads. Also, power supply to the loads 109 and 110 is performed with stability.

By the way, in the case of a single-phase three-wire system AC power supply, conversion blocks 114 and 115, each of which includes a reactor, a transistor, and a diode a in FIG. 24, are connected to AC power supplies 112 and 113, as shown in FIG. 25. In this drawing, reference numerals 116 and 117 denote capacitors, numerals 120 and 121 resistances, and numeral 124 a battery.

In the case of such a single-phase three-wire system, an attempt may be made to use the conventional technique disclosed in JP Patent No. 2765372 described above, which is also capable of coping with unbalanced loads when an abnormality occurs in an AC power supply. Then, there may be conceived a method with which control is performed so that the voltage values of the capacitors 116 and 117 are balanced by switching contact points of the switch means 125 and 126 as shown in FIG. 26. However, with the construction shown in FIG. 26, the voltages VC1 and VC2 of the capacitors 116 and 117 are applied to the reactors within the conversion blocks 114 and 115 as they are, so that there occurs a problem that ripple currents flowing to the reactors become large. As a result, the efficiency of AC/DC conversion is lowered or noise from the reactors is increased.

Also, as shown in FIG. 27, there may be a case where a filter capacitor 130 is connected to remove a ripple current that occurs in the reactor 102 due to the switching of the transistors 103 and 104. In this case, as shown in FIG. 28, when it is detected that an abnormality occurs in the AC power supply 100 (T(fault)) and the switch means 101 is switched from "A" to "B", a voltage remains in the filter capacitor 130. Consequently, a steep current that leads to the discharging of the voltage of the filter capacitor 130 is generated concurrently with the switching of the switch means 101. Also, this steep current flows to the switch means 101, so that there may occur a problem that the switch means 101 is damaged by an excess current. FIG. 28(a) shows a voltage waveform of the AC power supply 100, FIG. 28(b) shows a voltage waveform of the filter capacitor 130, and FIG. 28(c) shows a current waveform of the filter capacitor 130.

The present invention has been made to solve the problems described above, and a first object of the present invention is to provide a power conversion apparatus having a plurality of AC power supplies, wherein even if an abnormality occurs in at least one of the AC power supplies and loads that are respectively connected to two capacitors are not balanced, the power conversion apparatus is capable of balancing voltages of the two capacitors and is also capable of reducing losses and noises by decreasing a ripple current flowing to a reactor during the switching of the transistors 103 and 104.

Also, in the case where a filter capacitor is connected, a second object of the present invention is to provide a power conversion apparatus that is capable of preventing a situation where a switch means is damaged because electric charges of the filter capacitor are discharged and a steep current flows to the switch means when the switch means is turned on.

Further, in the case where a filter capacitor is connected, a third object of the present invention is to provide a power conversion apparatus that is capable of reducing losses by suppressing unnecessary resonance that occurs between the filter capacitor and a reactor when a switch means is turned on.

DISCLOSURE OF THE INVENTION

According to the present invention, a first power conversion apparatus is provided with: a first AC/DC conversion means constructed by connecting a first AC power supply, a first reactor, and a series body of a first switching means in series; a second AC/DC conversion means constructed by connecting a second AC power supply, a second reactor, and a series body of a second switching means in series; two capacitors connected in series, an interconnection point of the two capacitors being connected to one end of each of the two AC power supplies, and the two capacitors receiving energy supplied by DC voltages obtained by the first and second AC/DC conversion means; loads that are respectively connected to the two capacitors; and a battery connected to the two capacitors that are connected in series, the power conversion apparatus comprising:
a first switch means that is connected between the first AC power supply and the first reactor, connects the first reactor to the first AC power supply if the first and second AC power supplies operate normally, and connects the first reactor to a connection point between the second reactor and the series body of the second switching means if one of the first and second AC power supplies operates abnormally;
a second switch means that is connected between the second AC power supply and the second reactor, connects the second reactor to the second AC power supply if the first and second AC power supplies operate normally, and connects the first reactor and the second reactor in series by connecting the second reactor to an interconnection point between the capacitors if one of the first and second AC power supplies operates abnormally; and
a control apparatus that controls a voltage difference between the two capacitors, wherein:
if the first and second AC power supplies operate normally, the control apparatus controls a current flowing to the first reactor using the series body of the first switching means to perform AC/DC conversion and controls a current flowing to the second reactor using the series body of the second switching means to perform AC/DC conversion; and
if one of the first and second AC power supplies operates abnormally, the control apparatus has the battery supply energy to the two capacitors and controls the current flowing to the first reactor using the series body of the first switching means.

With this construction, in the power conversion apparatus having the plurality of AC power supplies, when at least one of the AC power supplies operates abnormally, even in the case where loads that are respectively connected to two capacitors are unbalanced, it is possible to balance voltages of these capacitors. Also, during this operation, there is obtained an effect that losses and noises are reduced by reducing ripple currents flowing to the reactors due to the opening/closing of the first switching means.

According to the present invention, a second power conversion apparatus is provided with: a first AC/DC conversion means constructed by connecting a first AC power supply, a first reactor, and a series body of a first switching means in series; a second AC/DC conversion means constructed by connecting a second AC power supply, a second reactor, and a series body of a second switching means in series; two capacitors connected in series, an interconnection point of the two capacitors being connected to one end of each of the two AC power supplies, and the two capacitors receiving energy supplied by DC voltages obtained by the first and second AC/DC conversion means; loads that are respectively connected to the two capacitors; and a battery connected to the two capacitors that are connected in series, the power conversion apparatus comprising:
a first switch means that is connected between the first AC power supply and the first reactor;
a second switch means that is connected between the second AC power supply and the second reactor;
a third switch means that is connected between a connection point between the first switch means and the first reactor, and a connection point between the second reactor and the series body of the second switching means;
a fourth switch means that is connected between a connection point between the second switch means and the second reactor, and an interconnection point between the capacitors;
a series body of a fifth switch means and a first filter capacitor that is connected between a connection point between the third switch means and the first reactor, and an interconnection point between the capacitors;
a second filter capacitor that is connected between a connection point between the fourth switch means and the second reactor, and an interconnection point between the capacitors; and
a control apparatus that controls a voltage difference between the two capacitors, wherein:
if the first and second AC power supplies operate normally, the control apparatus turns on the first switch means, the second switch means, and the fifth switch means and turns off the third switch means and the fourth switch means, so that a current flowing to the first reactor is controlled using the series body of the first switching means to perform AC/DC conversion, a high-frequency current flowing to the first reactor is absorbed using the first filter capacitor, a current flowing to the second reactor is controlled using the series body of the second switching means to perform AC/DC conversion, and a high-frequency current flowing to the second reactor is absorbed using the second filter capacitor; and
if one of the first and second AC power supplies operate abnormally, the control apparatus turns off the first switch means and the second switch means, sets a voltage of the second filter capacitor to approximately zero through switching of the series body of the second switching means, sets a current of the first reactor to approximately zero through switching of the series body of the first switching means, turns on the third switch means and the fourth switch means, turns off the fifth switch means, connects the first reactor to a connection point between the second reactor and the series body of the second switching means, and connects the first reactor to the second reactor in series, so that energy is supplied to the two capacitors using the battery and a current flowing to the first reactor is controlled using the series body of the first switching means.

With this construction, in the power conversion apparatus having the plurality of AC power supplies, when at least one of the AC power supplies operates abnormally, even in the case where loads that are respectively connected to two capacitors are unbalanced, it is possible to balance voltages of these capacitors. Also, during this operation, there is obtained an effect that it is possible to reduce losses and noises by reducing ripple currents flowing to reactors due to the opening/closing of the first switching means. Also, there is circumvented a situation where electric charges of the second filter capacitor are discharged when the fourth switch means is turned on and therefore a steep current flows to the fourth switch means and the fourth switch means is damaged. Also, the fifth switch means is turned off by setting the current of the first reactor to zero, so that there is circumvented a problem that the fifth switch means is damaged by energy accumulated in the first reactor when the fifth switch means is turned off.

According to the present invention, a third power conversion apparatus is provided with: a first AC/DC conversion means constructed by connecting a first AC power supply, a first reactor, and a series body of a first switching means in series; a second AC/DC conversion means constructed by connecting a second AC power supply, a second reactor, and a series body of a second switching means in series; two capacitors connected in series, an interconnection point of the two capacitors being connected to one end of each of the two AC power supplies, and the two capacitors receiving energy supplied by DC voltages obtained by the first and second AC/DC conversion means; loads that are respectively connected to the two capacitors; and a battery connected to the two capacitors that are connected in series, the power conversion apparatus comprising:

a first switch means that is connected between the first AC power supply and the first reactor;

a second switch means that is connected between the second AC power supply and the second reactor;

a third switch means that is connected between a connection point between the first switch means and the first reactor, and a connection point between the second reactor and the series body of the second switching means;

a fourth switch means that is connected between a connection point between the second switch means and the second reactor, and an interconnection point between the capacitors;

a first filter capacitor that is connected between a connection point between the third switch means and the first reactor, and an interconnection point between the capacitors;

a second filter capacitor that is connected between a connection point between the fourth switch means and the second reactor, and an interconnection point between the capacitors; and a control apparatus that controls a voltage difference between the two capacitors, wherein:

if the first and second AC power supplies operate normally, the control apparatus turns on the first switch means and the second switch means and turns off the third switch means and the fourth switch means, so that a current flowing to the first reactor is controlled using the series body of the first switching means to perform AC/DC conversion, a high-frequency current flowing to the first reactor is absorbed using the first filter capacitor, a current flowing to the second reactor is controlled using the series body of the second switching means to perform AC/DC conversion, and a high-frequency current flowing to the second reactor is absorbed using the second filter capacitor; and if one of the first and second AC power supplies operate abnormally, the control apparatus turns off the first switch means and the second switch means, sets a voltage of the first filter capacitor to approximately zero through switching of the series body of the first switching means, sets a voltage of the second filter capacitor to approximately zero through switching of the series body of the second switching means, turns on the third switch means and the fourth switch means, connects the first reactor to a connection point between the second reactor and the series body of the second switching means, and connects the first reactor to a parallel connection body of the second reactor and the first filter capacitor in series, so that energy is supplied to the two capacitors using the battery and a current flowing to the first reactor is controlled using the series body of the first switching means.

With this construction, in the power conversion apparatus having the plurality of AC power supplies, when at least one of the AC power supplies operates abnormally, even in the case where loads that are respectively connected to two capacitors are not balanced, it is possible to balance voltages of these capacitors. Also, during this operation, there is obtained an effect that it becomes possible to reduce losses and noises by reducing ripple currents flowing to reactors due to the opening/closing of the first switching means. Also, there is circumvented a situation where electric charges of the second filter capacitor are discharged when the fourth switch means is turned on and therefore a steep current flows to the fourth switch means and the fourth switch means is damaged. Further, it is also possible to suppress unnecessary resonance between the first filter capacitor and the second reactor when the third switch means is turned on, which makes it possible to reduce losses.

BRIEF DESCRIPTION OF THE DRAWINGS

FIG. 13 is an equivalent circuit diagram illustrating a state before third and fourth switch means according to the second embodiment are turned on;

BEST MODE FOR CARRYING OUT THE INVENTION (First Embodiment)

Figure 1:
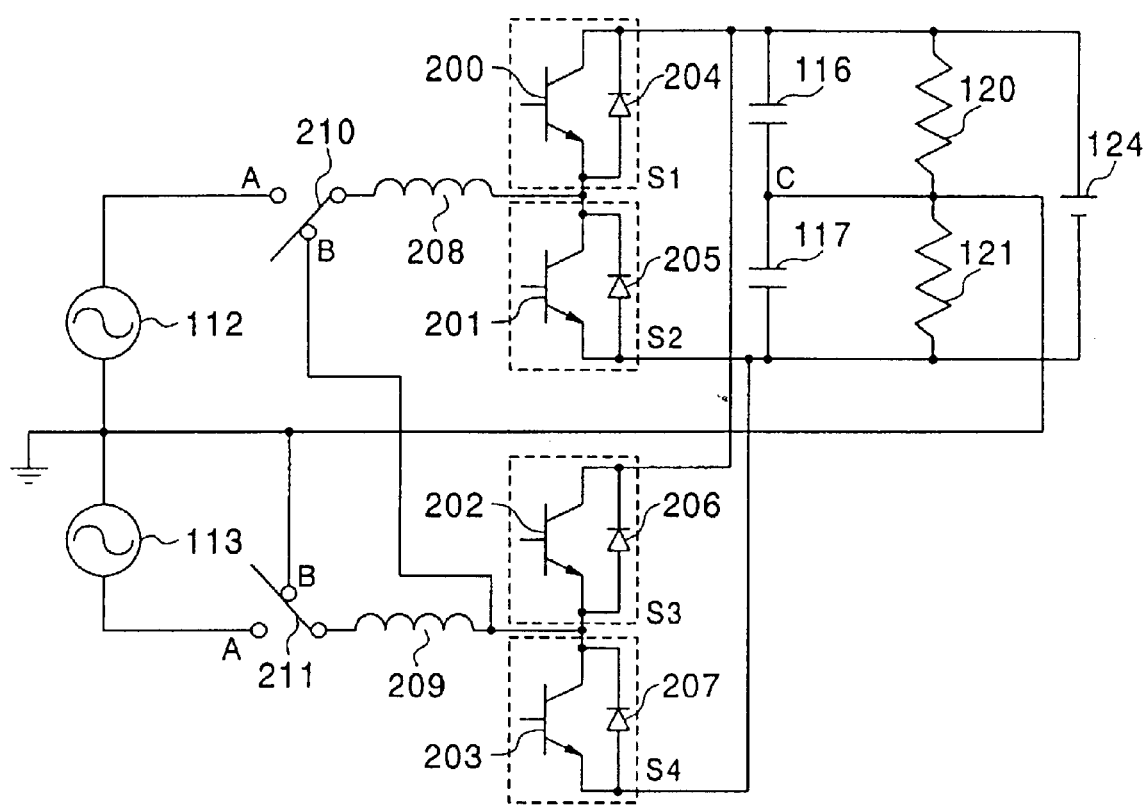
FIG. 1 is a circuit diagram showing a circuit construction of a power conversion apparatus according to a first embodiment.

Embodiments of the present invention will be described below with reference to the drawings. FIG. 1 is a circuit diagram showing a power conversion apparatus according to a first embodiment of the present invention. In this drawing, reference numerals 112 and 113 denote first and second AC power supplies (hereinafter simply referred to as "AC power supplies" in some cases), numerals 116 and 117 capacitors, numerals 120 and 121 resistors (loads) functioning as DC loads, numeral 124 a battery, numerals 200 to 203 transistors, numerals 204 to 207 diodes, numerals 208 and 209 first and second reactors (hereinafter simply referred to as "reactors" in some cases), and numerals 210 and 211 first and second switch means (hereinafter simply referred to as "switch means" in some cases), which are, for instance, constructed from mechanical relays and the like. Also, although not illustrated, a control apparatus is connected to each of the switch means 210 and 211 and the transistors 200 to 203, and there are controlled the switching of the connection state of each of the switch means 210 and 211 and the turning on/off of each of the transistors 200 to 203. The control of the turning on/off of each of the transistors 200 to 203 is performed using a method that is, for instance, the same as the method shown in FIG. 1 of JP Patent No. 2765372. Also, the control of the switching of the connection state of each of the switch means 210 and 211 is, for instance, performed by a signal from a microcomputer or the like, a driving circuit that drives the mechanical relays, and the like.

Switching means S1 is constructed from the transistor 200 and the diode 204, switching means S2 is constructed from the transistor 201 and the diode 205, switching means S3 is constructed from the transistor 202 and the diode 206, and switching means S4 is constructed from the transistor 203 and the diode 207. The series body of a first switching means is constructed by connecting the switching means S1 including the transistor 200 and the diode 204 to the switching means S2 including the transistor 201 and the diode 205 in series, while the series body of a second switching means is constructed by connecting the switching means S3 including the transistor 202 and the diode 206 to the switching means S4 including the transistor 203 and the diode 207 in series.

Also, a first AC/DC conversion means is constructed by connecting the first AC power supply 112, the first reactor 208, and the series body of the first switching means in series, while a second AC/DC conversion means is constructed by connecting the second AC power supply 113, the second reactor 209, and the series body of the second switching means in series.

The two capacitors 116 and 117 are connected in series and the interconnection point C between these capacitors is connected to one end of each of the two AC power supplies 112 and 113, and energy is supplied by DC voltages obtained by the first and second AC/DC conversion means.

Also, the resistors 120 and 121 functioning as DC loads are respectively connected to the two capacitors 116 and 117, and the battery 124 is connected to the series connection body of the two capacitors 116 and 117.

The first switch means 210 is connected between the first AC power supply 112 and the first reactor 208. In the case where the first and second AC power supplies 112 and 113 operate normally, the first switch means 210 is connected to the contact point A and connects the first reactor 208 to the first AC power supply 112. In the case where the first or second AC power supply 112 or 113 operates abnormally, the first switch means 210 is connected to the contact point B and changes its connection state so that the first reactor 208 is connected to a connection point between the second reactor 209 and the series body of the second switching means.

The second switch means 211 is connected between the second AC power supply 113 and the second reactor 209. In the case where the first and second AC power supplies 112 and 113 operate normally, the second switch means 211 is connected to the contact point A and connects the second reactor 209 to the second AC power supply 113. In the case where the first or second AC power supply 112 or 113 operate abnormally, the second switch means 211 is connected to the contact point B and changes its connection state so that the second reactor 209 is connected to an interconnection point between the capacitors 116 and 117. As a result, the first reactor 208 and the second reactor 209 are connected in series.

Next, an operation of this power conversion apparatus will be described. In the case where the AC power supplies 112 and 113 operate normally, the switch means 210 and 211 are connected to the contact points A by the control apparatus, and currents flowing to the reactors 208 and 209 are controlled by the control apparatus that alternately turns on/off the transistors 200 and 201 and alternately turns on/off the transistors 202 and 203, so that the power factors of currents flowing to the AC power supplies 112 and 113 become one. In this manner, AC/DC conversion is performed and the capacitors 116 and 117 are charged. Also, the charged energy is supplied to the resistors 120 and 121.

When an abnormality, such as a power failure or a momentary voltage drop, occurs in either of the AC power supplies 112 and 113, the switch means 210 and 211 are connected to the contact points B by the control apparatus and energy is supplied from the battery 124 to the capacitors 116 and 117.

In the case where the resistors 120 and 121 have the same resistance value, that is, in the case where these resistors consume the same amount of power, the energy supplied from the capacitor 116 to the resistor 120 becomes the same as the energy supplied from the capacitor 117 to the resistor 121. As a result, the voltages of the capacitors 120 and 121 become equal to each other at all times. That is, the voltage values of the capacitors 116 and 117 are balanced by the energy supplied by the battery 124.

However, in the case of unbalanced loads where the resistors 120 and 121 have different values, the voltage values of the capacitors 116 and 117 are unbalanced. This is because only the battery 124 performs the charging of the two capacitors 116 and 117 and it is impossible to control the potential at an interconnection point C between the capacitors 116 and 117.

Even if the AC power supplies 112 and 113 operate normally, in the case of unbalanced loads, the voltage values of the capacitors 116 and 117 tend to be unbalanced. However, for instance, by changing the ratio between on/off times during the switching of the transistors 200 and 201 and the switching of the transistors 202 and 203 in accordance with the system disclosed in FIGS. 8, 9, and 10 of JP Laid-Open No. 2000-278954, such unbalance is eliminated.

When an abnormality, such as a power failure or a momentary voltage drop, occurs in the AC power supply 112 or 113, there occurs a problem concerning unbalance. Therefore, to solve this problem, the switch means 210 and 211 are connected to the contact points B and the transistors 202 and 203 are turned off.

Figure 2:
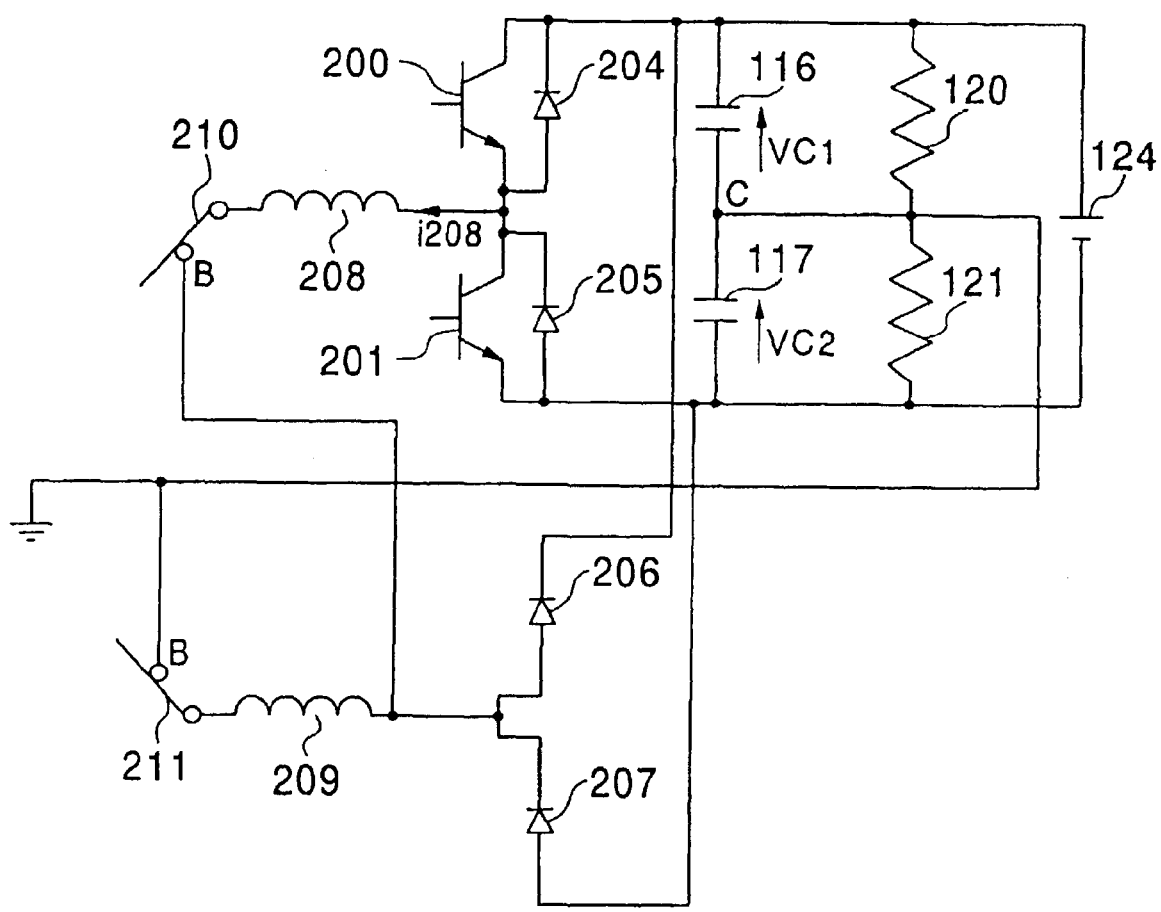
FIG. 2 is an equivalent circuit diagram illustrating an operation performed when an abnormality occurs in an AC power supply in the power conversion apparatus according to the first embodiment.

An equivalent circuit during this operation is shown in FIG. 2. The reactor 208 and the reactor 209 are connected to each other in series and the control of currents of these reactors 208 and 209 is performed by the turning on/off of the transistors 200 and 201.

Figure 3:
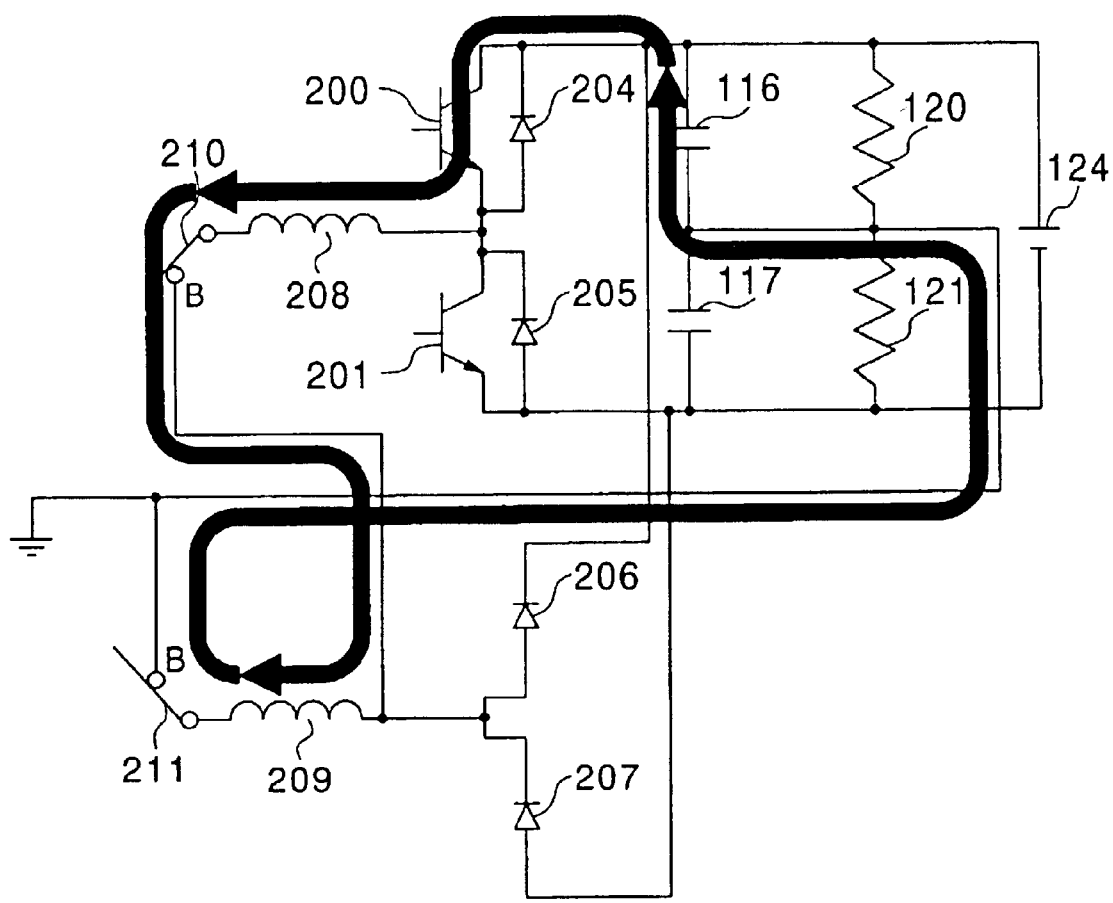
FIGS. 3 and 4 are explanatory drawings illustrating an operation performed when an abnormality occurs in an AC power supply in the power conversion apparatus according to the first embodiment.

An operation of the power conversion apparatus at this time will be described in detail. In FIG. 2, if the value of the resistor 120 is greater than the value of the resistor 121, both of the capacitors 116 and 117 are charged by the battery 124, so that the voltage of the capacitor 117 attempts to drop and the voltage of the capacitor 116 attempts to rise. To suppress this phenomenon, the transistor 200 is first turned on (the transistor 201 is turned off), thereby allowing a current to flow in the manner shown in FIG. 3 and accumulating the energy of the capacitor 116 in the reactors 208 and 209.

Figure 4:
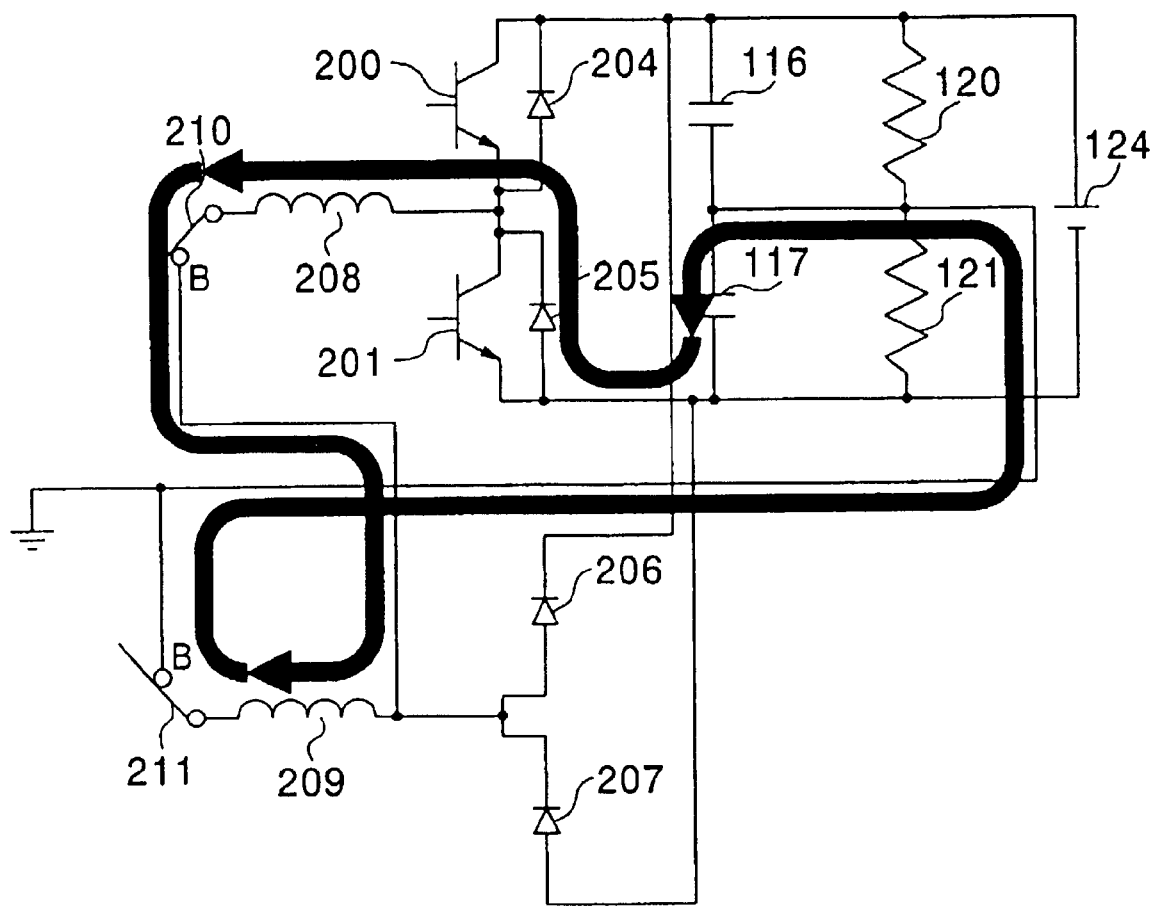

Next, the transistor 200 is turned off (the transistor 201 is turned off), thereby allowing a current to flow in the manner shown in FIG. 4 and accumulating, in the capacitor 117, the energy accumulated in the reactors 208 and 209. By transferring the energy of the capacitor 116 to the capacitor 117 in this manner, the voltage of the capacitor 116 and the voltage of the capacitor 117 are balanced.

Figure 5:
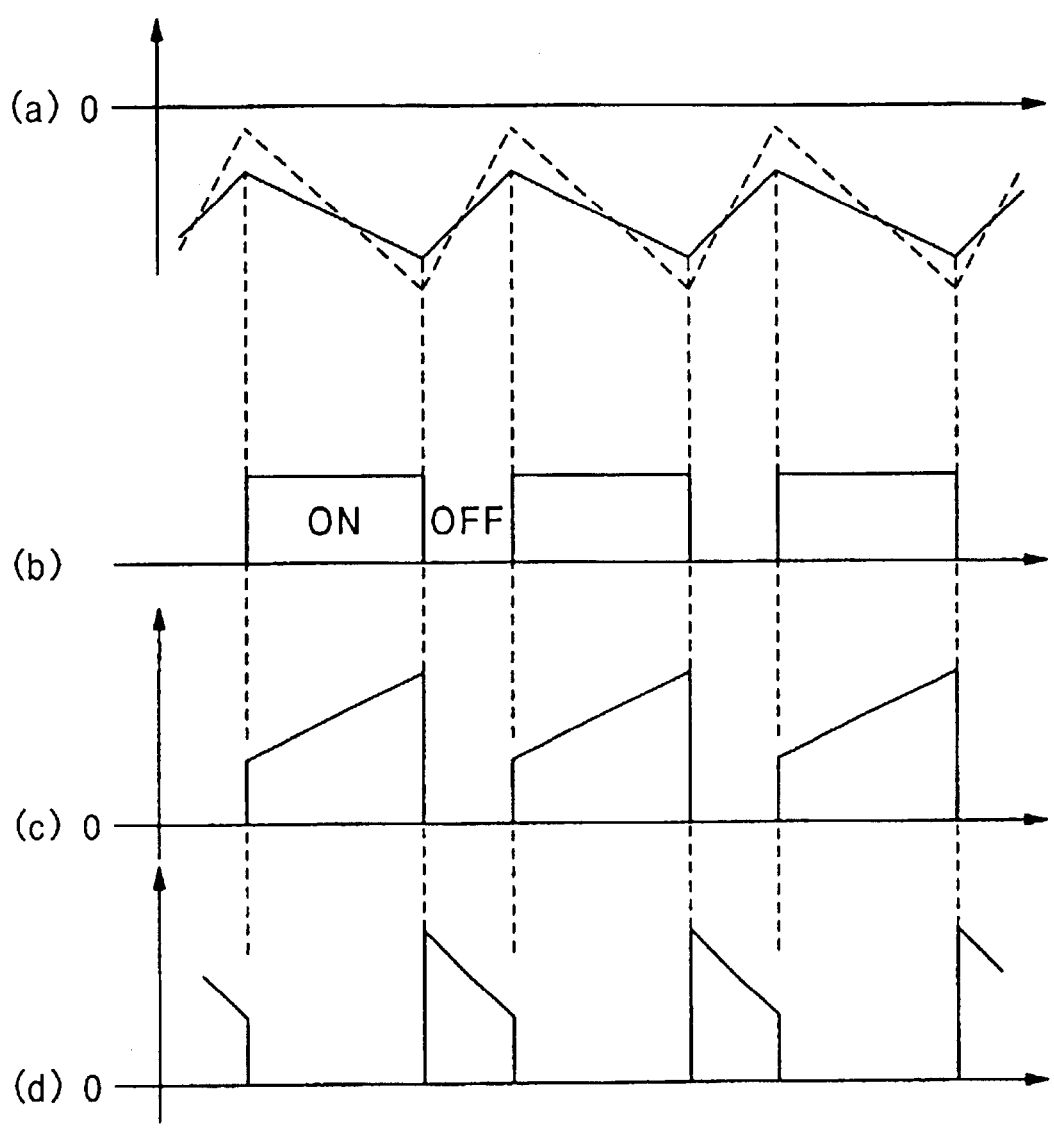
FIG. 5 is an explanatory drawing illustrating a current waveform in the equivalent circuit shown in FIG. 2 according to the first embodiment and a gate signal waveform of a switch means.
Figure 26:
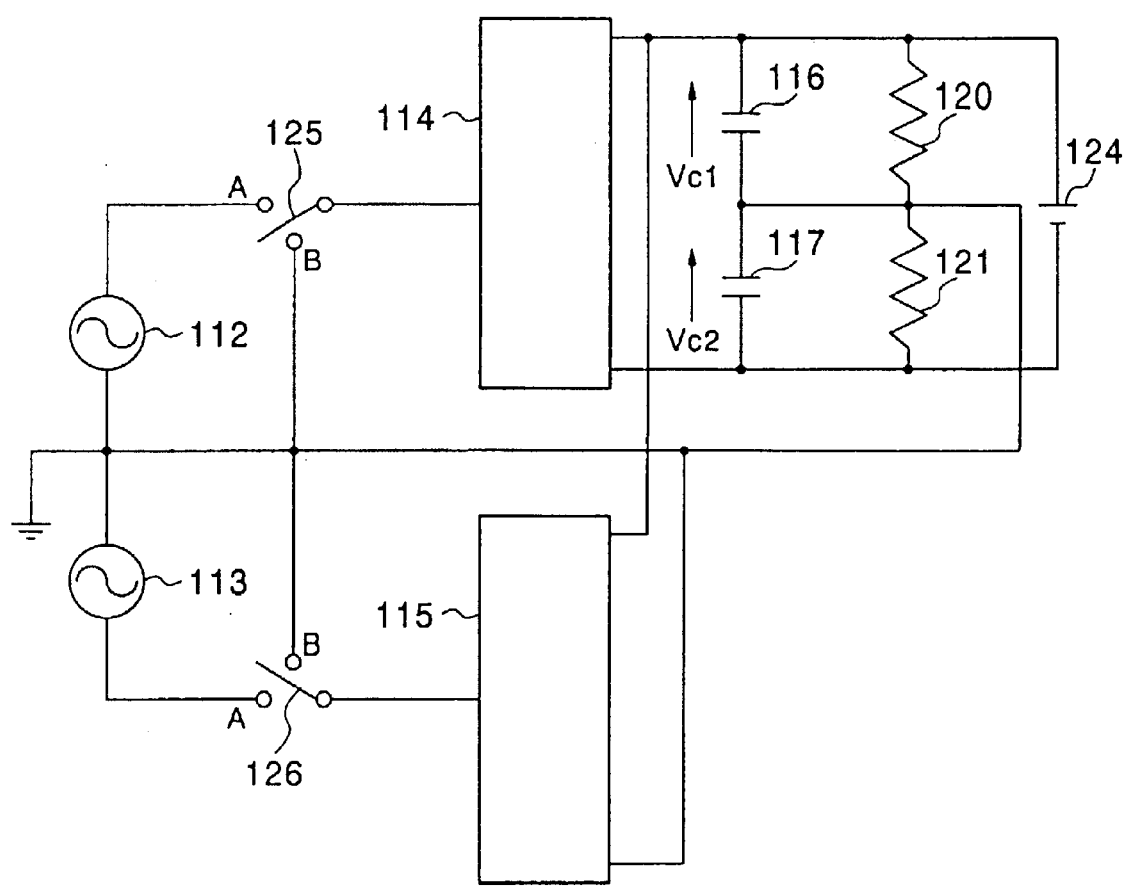
FIG. 26 is a circuit diagram in the case where a conventional technique, with which it is possible to cope with unbalanced loads when an abnormality occurs in an AC power supply shown in FIG. 24, is applied to the power conversion apparatus shown in FIG. 25 having the single-phase three-wire system AC power supply.
Figure 27:
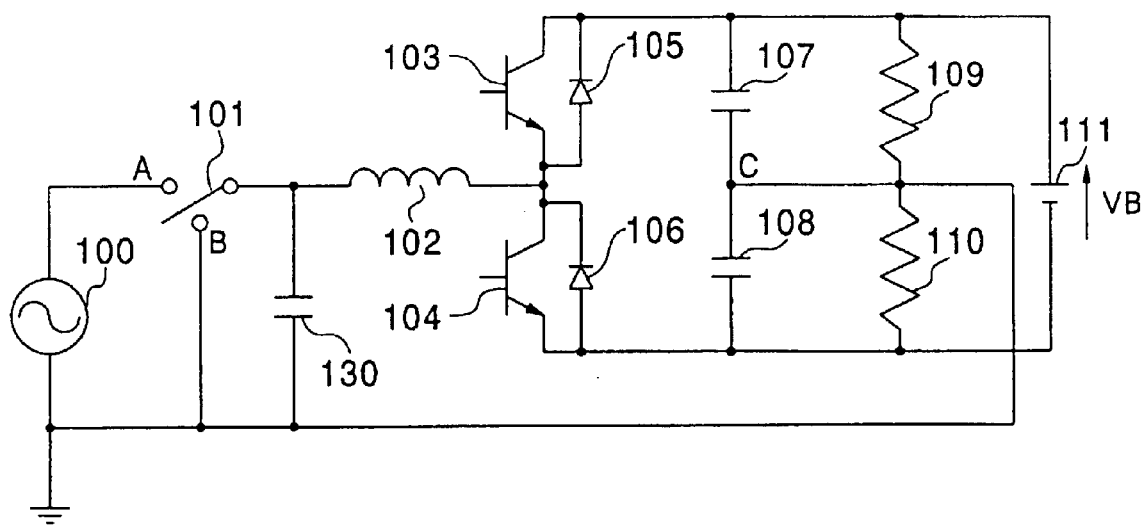
FIG. 27 is a circuit diagram in the case where a filter capacitor is connected to the conventional power conversion apparatus shown in FIG. 24.
Figure 28:
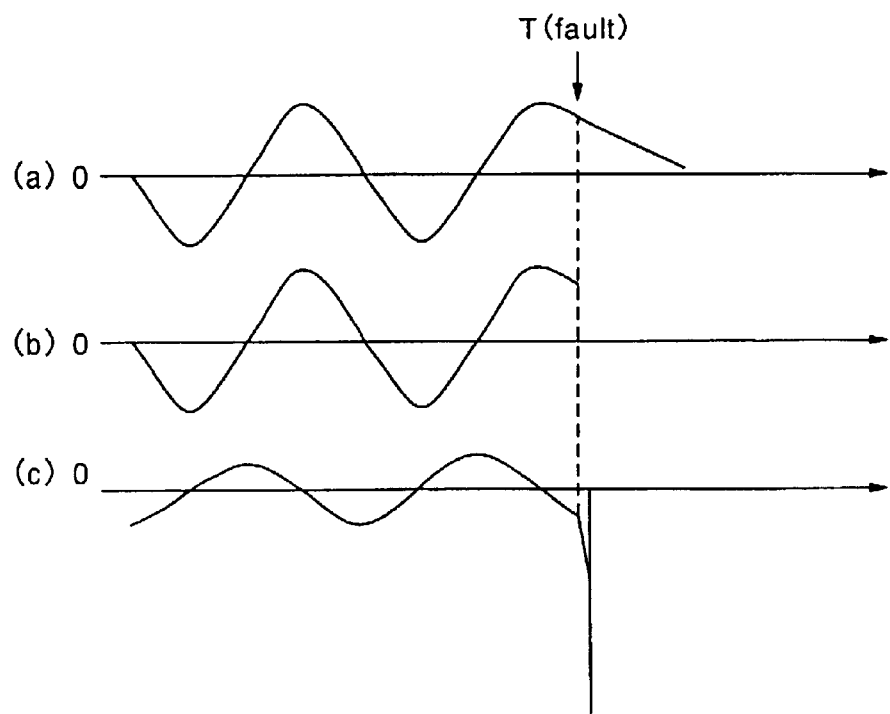
FIG. 28 is an explanatory drawing illustrating an operation of the power conversion apparatus shown in FIG. 27.

Current waveforms during this operation are shown in FIG. 5. FIG. 5(a) shows a current waveform of the reactor 208, with this current waveform being the same as the current waveform of the reactor 209. Note that the broken line represents the case shown in FIG. 26. FIG. 5(b) shows a gate signal waveform of the transistor 200, FIG. 5(c) shows a current waveform flowing to the transistor 200, and FIG. 5(d) shows a current waveform flowing to the diode 205. As to the direction of a current flowing to each of the reactors 208 and 209, in the case where a flow direction from the left to the right in FIG. 2 is regarded as positive, the flowing current is negative.

By turning on/off the transistor 200 in this manner, current control is performed in the manner shown in FIG. 5A and the currents of the reactors 208 and 209 are controlled so that the voltages of the two capacitors 116 and 117 are balanced.

Also, during this operation, the two reactors 208 and 209 are connected in series. Consequently, as to the voltages applied to these reactors 208 and 209, if the value of the reactor 208 is the same as the value of the reactor 209, voltages that are halves of the voltages VC1 and VC2 of the capacitors 116 and 117 are applied to the reactors 208 and 209, respectively. This means that the voltage applied to each of the reactors 208 and 209 becomes half of a capacitor voltage. Accordingly, as shown in FIG. 5(a), the magnitudes of ripple currents flowing to the reactors 208 and 209 are halved in comparison with the case shown in FIG. 26.

Figure 6:
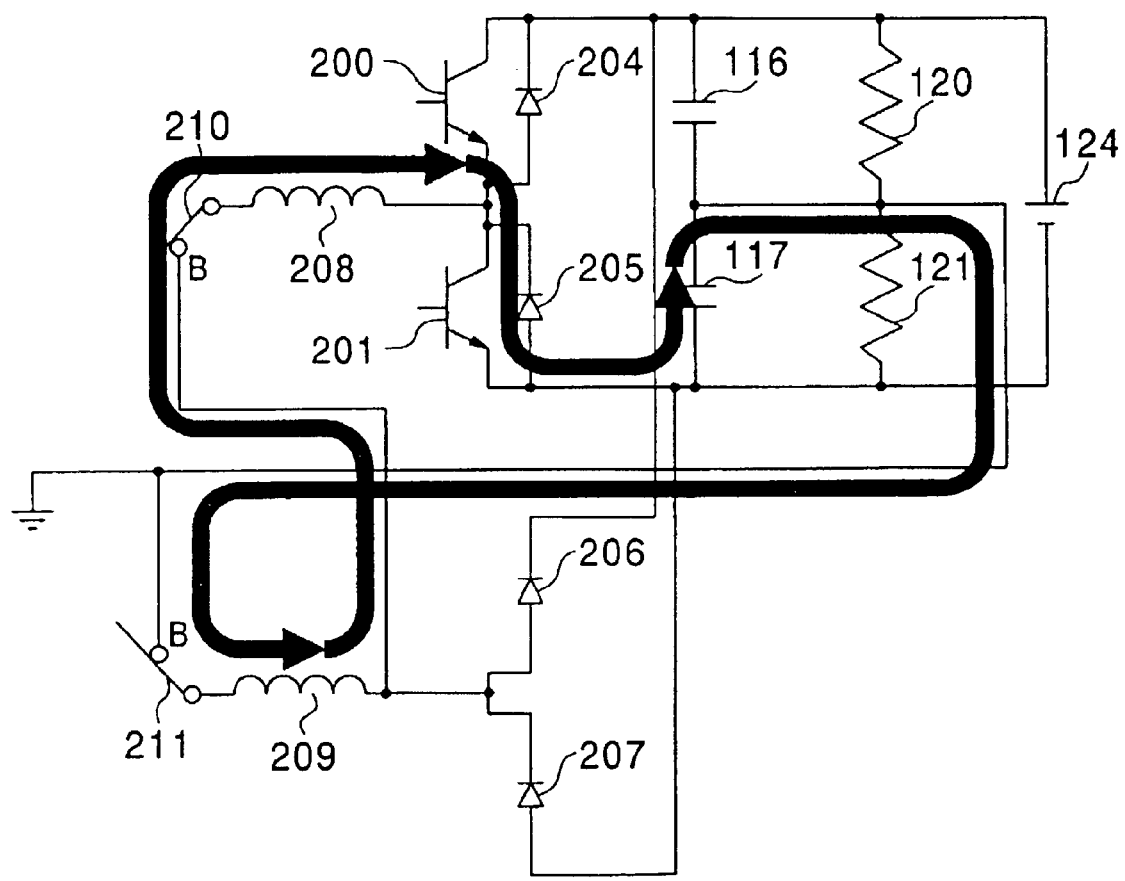
FIGS. 6 and 7 are explanatory drawings illustrating another operation performed when an abnormality occurs in the AC power supply in the power conversion apparatus according to the first embodiment.

Also, in FIG. 2, the battery 124 charges both of the capacitors 116 and 117, so that if the value of the resistor 120 is smaller than the value of the resistor 121, the voltage of the capacitor 117 attempts to rise and the voltage of the capacitor 116 attempts to drop. To suppress this phenomenon, the transistor 201 is first turned on (the transistor 200 is turned off), thereby allowing a current to flow in the manner shown in FIG. 6 and accumulating the energy of the capacitor 117 in the reactors 208 and 209.

Figure 7:
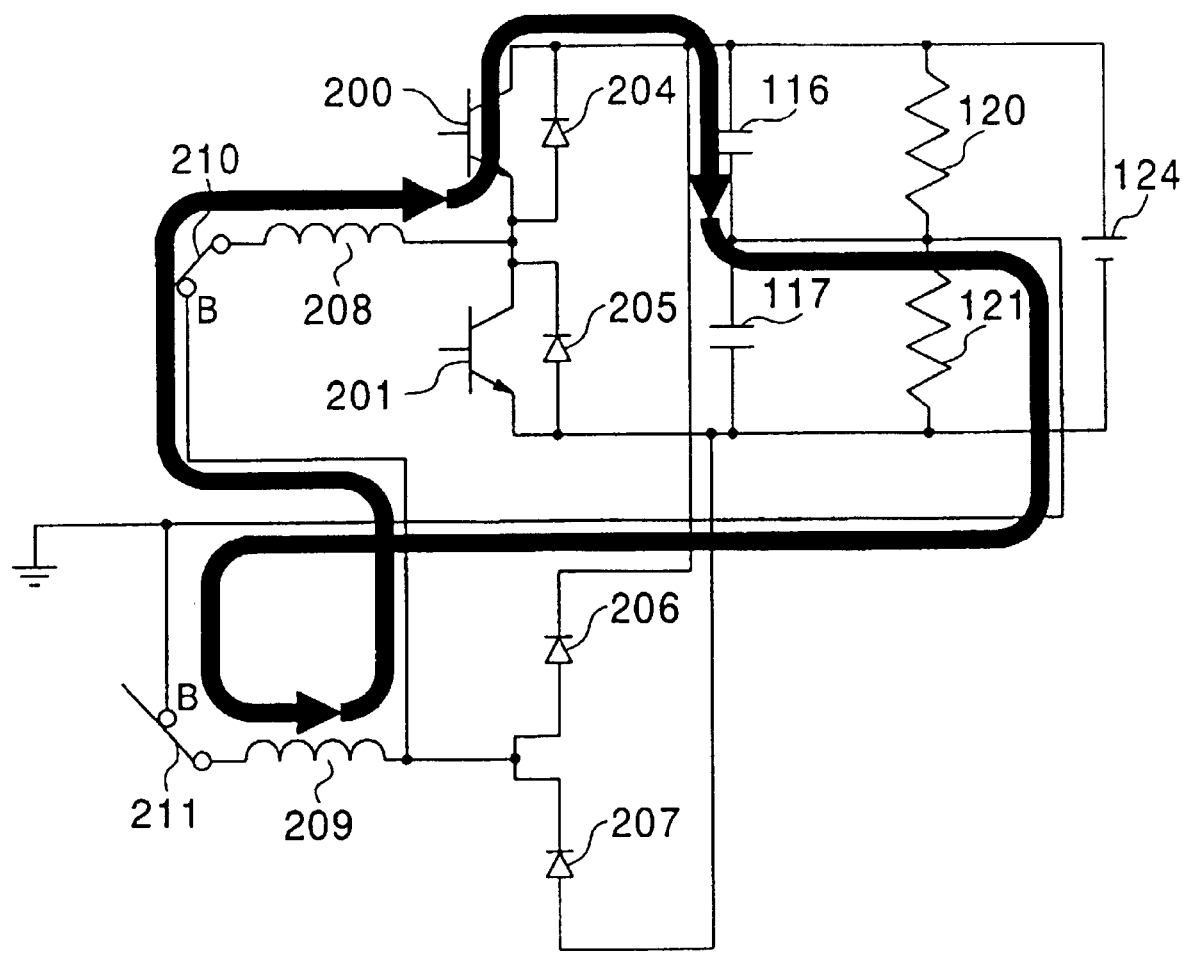

Next, the transistor 201 is turned off (the transistor 200 is turned off), thereby allowing a current to flow in the manner shown in FIG. 7 and accumulating, in the capacitor 116, the energy accumulated in the reactors 208 and 209. By transferring the energy of the capacitor 117 to the capacitor 116 in this manner, the voltage of the capacitor 116 and the voltage of the capacitor 117 are balanced.

Figure 8:
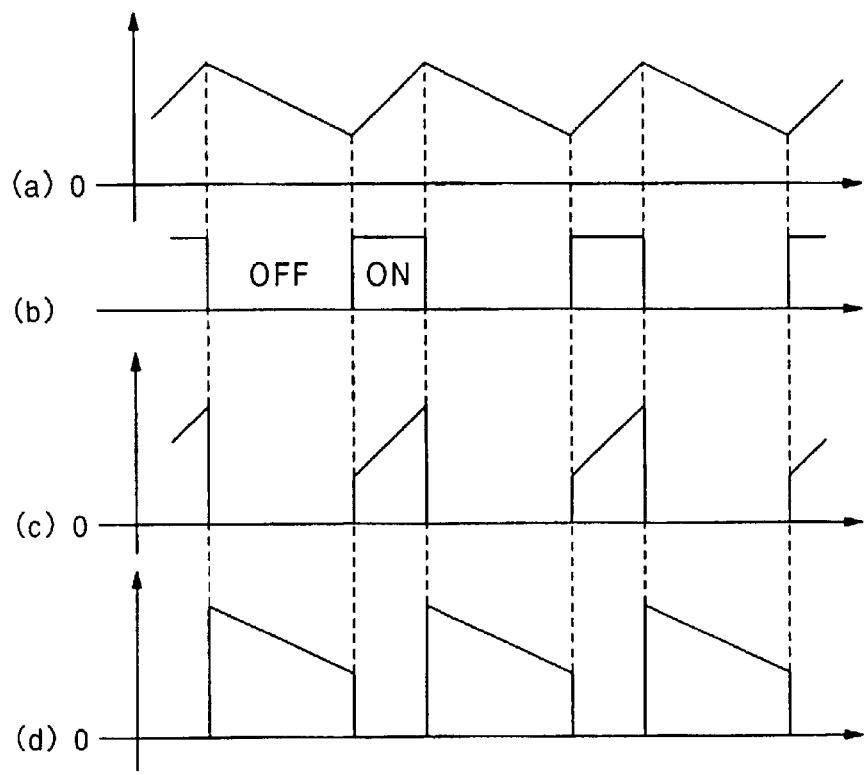
FIG. 8 is an explanatory drawing illustrating another current waveform in the equivalent circuit shown in FIG. 2 according to the first embodiment and a gate signal waveform of the switch means.

Current waveforms during this operation are shown in FIG. 8. FIG. 8(a) shows a current waveform of the reactor 208, with this current waveform being the same as the current waveform of the reactor 209. FIG. 8(b) shows a gate signal waveform of the transistor 201, FIG. 8(c) shows a current waveform flowing to the transistor 201, and FIG. 8(d) shows a current waveform flowing to the diode 204. As to the direction of a current flowing to each of the reactors 208 and 209, a flow direction from the left to the right is regarded as positive in FIG. 2, so that the flowing current is positive.

By turning on/off the transistor 201 in this manner, current control is performed in the manner shown in FIG. 8A and the currents of the reactors 208 and 209 are controlled so that the voltages of the two capacitors 116 and 117 are balanced.

Also, during this operation, the two reactors 208 and 209 are connected in series. Consequently, as to the voltages applied to these reactors 208 and 209, if the reactors 208 and 209 have the same value, voltages that are halves of the voltages VC1 and VC2 of the capacitors 116 and 117 are applied to the reactors 208 and 209, respectively. This means that the voltage applied to each of the reactors 208 and 209 becomes half of a capacitor voltage. Accordingly, the magnitudes of ripple currents flowing to the reactors 208 and 209 are halved in comparison with the case shown in FIG. 26.

Also, switching is performed only for the transistor 200 while setting the transistor 201 turned off in FIG. 5, whereas switching is performed only for the transistor 201 while setting the transistor 200 turned off in FIG. 8. However, in either case, the transistors 200 and 201 may be alternatively turned on/off. That is, the same effect is achieved even if the transistor 201 is turned off when the transistor 200 is turned on and the transistor 200 is turned off when the transistor 201 is turned on.

Figure 9:
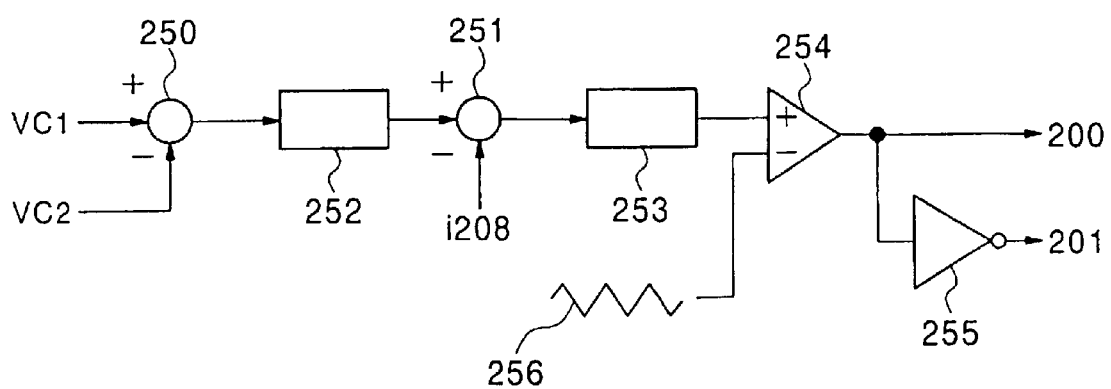
FIG. 9 is a circuit diagram illustrating a control circuit that balances voltages of two capacitors according to the first embodiment.

Next, FIG. 9 shows an example of a control circuit (control apparatus) that controls the voltage difference between the two capacitors 116 and 117 by controlling the current of the reactor 208. The construction shown in FIG. 9 is, for instance, the same as the construction of a control circuit shown in FIG. 15 of JP Laid-Open No. 2000-278954. In this drawing, reference numerals 250 and 251 denotes subtracters, numeral 252 a voltage controller, numeral 253 a current controller, numeral 254 a comparator, numeral 255 a NOT circuit, and numeral 256 a triangular wave. The voltages VC1 and VC2 of the capacitors 116 and 117 are inputted into the subtracter 250, while a current value i208 of a reactor 208 is inputted into the subtracter 251.

In a circuit constructed in this manner, first, the voltage difference between the voltages VC1 and VC2 of the capacitors 116 and 117 is detected by the subtracter 250 and is inputted into the voltage controller 252. On the basis of the inputted potential difference, the voltage controller 252 outputs an instruction concerning the current i208 that should flow to the reactor 208. Next, to have the detected current value i208 of the reactor 208 follow the current instruction described above, the current difference detected by the subtracter 251 is inputted into the current controller 253. The current controller 253 outputs an instruction concerning voltages to be applied to the reactors 208 and 209, the comparator 254 compares the voltage instruction with the triangular wave 256 that is a carrier signal, and a result outputted from the comparator 254 becomes an ON-signal of the transistor 200 and becomes an ON-signal of the transistor 201 via the NOT circuit 255. With the aforementioned construction of the control circuit, the voltage of the capacitor 116 and the voltage of the capacitor 117 are balanced.

As described above, with the technique of this embodiment, in the case where the AC power supply 112 or 113 operates abnormally, even if the loads 120 and 121 that are respectively connected to the capacitors 116 and 117 are not balanced, it is possible to balance the voltages of the two capacitors 116 and 117 by halving the voltages applied to the reactors 208 and 209. This makes it possible to obtain a stable AC/DC conversion operation and also to obtain a power conversion apparatus where the ripples of currents of the reactors 208 and 209 caused by the switching of the transistors 200 and 201 (opening/closing of the first switching means) are reduced to one-half and there are reduced losses and noises.

It should be noted here that there has been described a mode where the switching means S1 to S4 are constructed using transistors. However, needless to say, it is possible to obtain the same apparatus even if semiconductors, such as MOSFET, IGBT, and GTO, are used in place of the transistors. The same applies to each embodiment to be described later.

Figure 10:
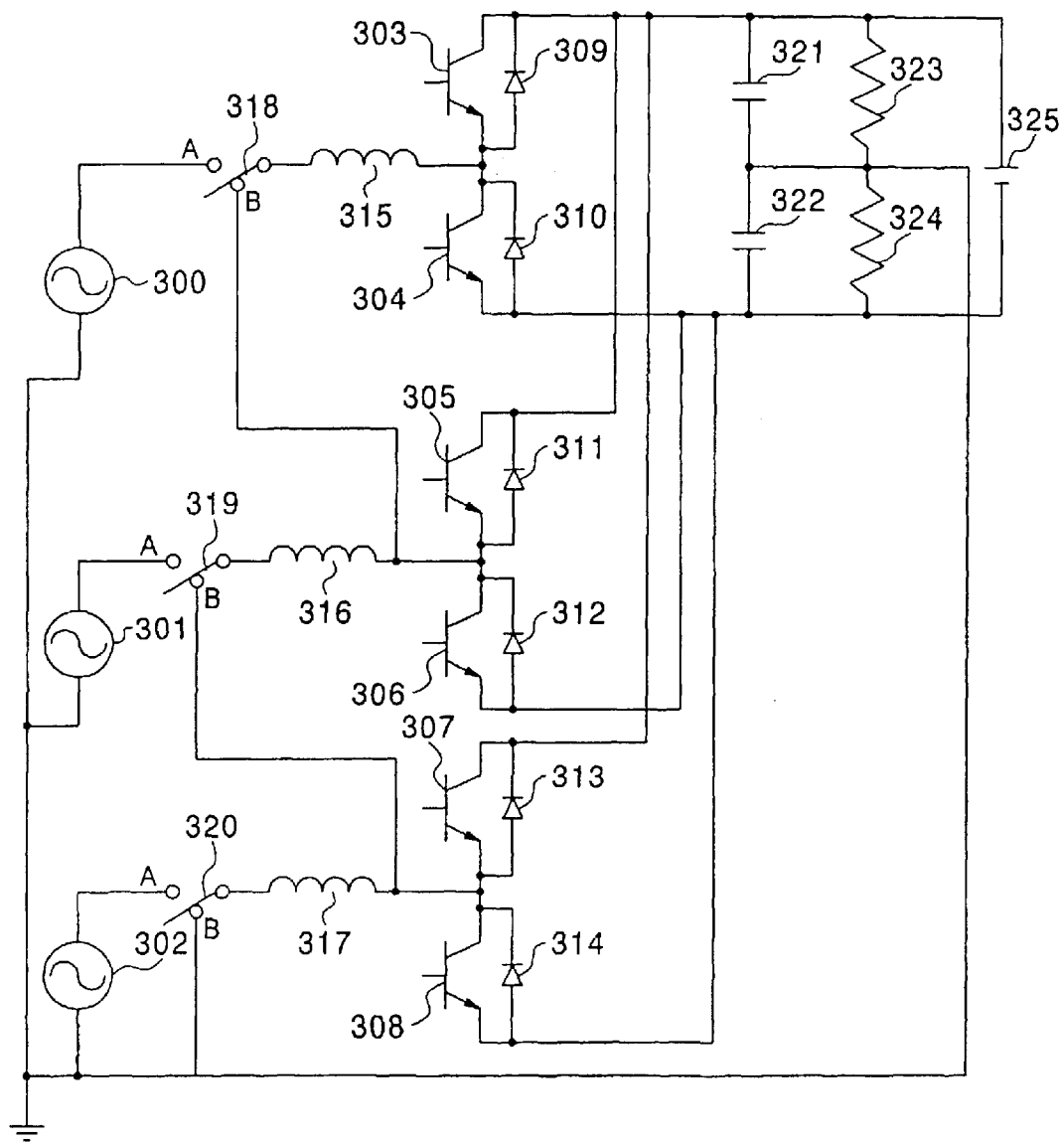
FIG. 10 is a circuit diagram illustrating a circuit construction of another power conversion apparatus according to the first embodiment.

It should be noted here that in FIG. 1, the AC power supplies 112 and 113 construct a single-phase three-wire system, although it is possible to construct the same apparatus even in the case of a three-phase four-wire system, as shown in FIG. 10. That is, reference numerals 300 to 302 denote AC power supplies, numerals 303 to 308 transistors, numerals 309 to 314 diodes, numerals 315 to 317 reactors, numerals 318 to 320 switch means, numerals 321 and 322 capacitors, numerals 323 and 324 resistors functioning as loads, and numeral 325 a battery.

In the case where the AC power supplies 300 to 302 operate normally, the switch means 318 to 320 are connected to contact points A and an unillustrated control apparatus performs control so that the power factors of currents of the reactors 315 to 317 become one by switching the transistors 303 to 308. In this manner, the capacitors 321 and 322 are charged and the charged energy is supplied to the resistors 323 and 324.

When an abnormality, such as a power failure, occurs in any one of the AC power supplies 300 to 302, the switch means 318 to 320 are connected to the contact points B by the unillustrated control apparatus and energy is supplied from the battery 325 to the capacitors 321 and 322.

If the values of the resistors 323 and 324 functioning as loads differ from each other during this operation, voltages of capacitors 321 and 322 tend to be unbalanced. However, by turning on/off only the transistors 303 and 304 while setting the transistors 305 to 308 turned off, such unbalance is eliminated with the same method as in the first embodiment.

Also, as to the voltages applied to reactors 315 to 317, these reactors 315 to 317 are connected in series, so that if the three reactors have the same value, voltages that are one-third of the voltages VC1 and VC2 of the capacitors 321 and 322 are applied. As a result, the voltage applied to each of the reactors 315, 316, and 317 becomes one-third of a capacitor voltage.

As described above, in the case where abnormality occurs in any one of the AC power supplies 300 to 302, even if the loads 323 and 324 that are respectively connected to the two capacitors 321 and 322 are not balanced, it is possible to balance the voltages of the two capacitors 321 and 322 by reducing voltages applied to respective reactors 315, 316, and 317 to one-third. This makes it possible to obtain a stable AC/DC conversion operation and also to obtain an apparatus where the ripples of currents of the reactors 315, 316, and 317 caused by the switching of the transistors 303 and 304 are reduced to one-third and there are reduced losses and noises.

Also, there has been shown the case of the three-phase four-wire system in FIG. 10, although it is possible to obtain the same construction and to achieve the same effect even in the case of an n-phase n+1-wire system (n≧4).

(Second Embodiment)

Figure 11:
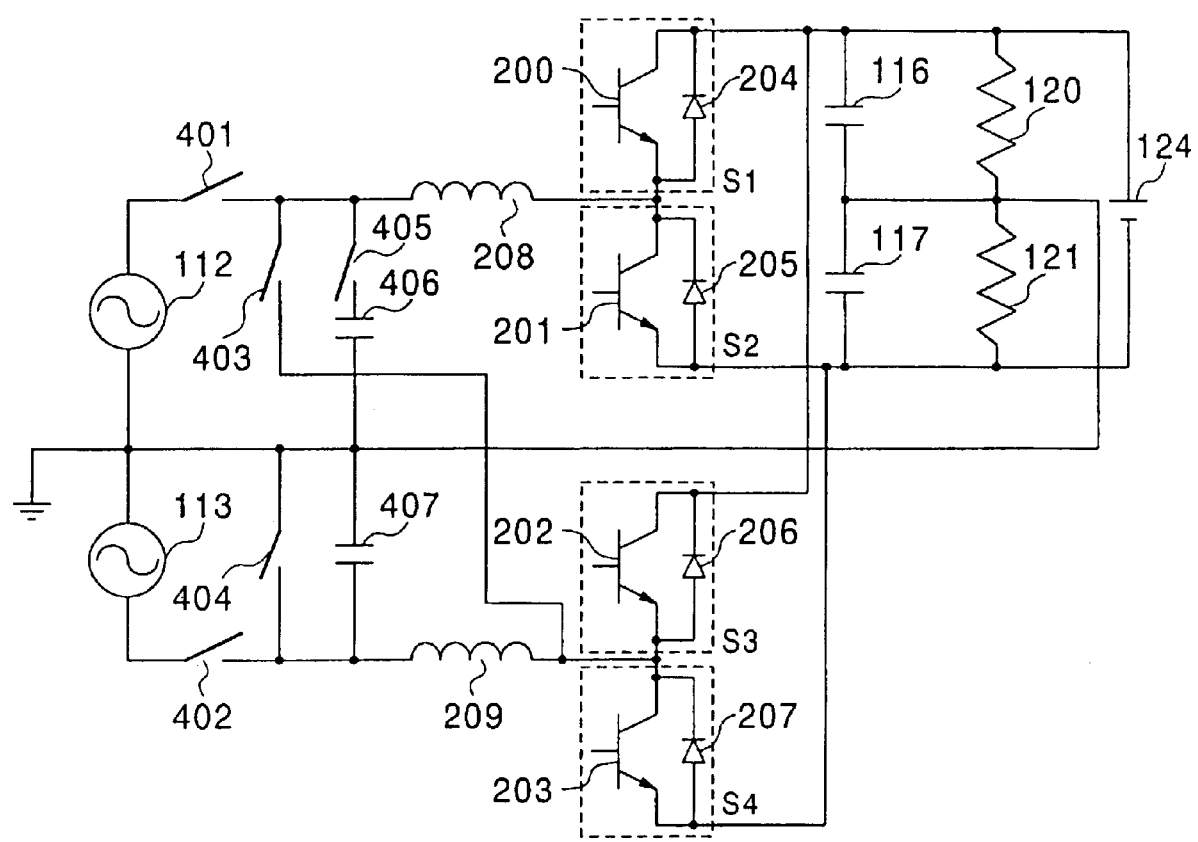
FIG. 11 is a circuit diagram illustrating a circuit construction of a power conversion apparatus according to a second embodiment.

FIG. 11 is a circuit diagram showing a power conversion apparatus according to the second embodiment of the present invention. In this drawing, reference numerals 401, 402, 403, 404, and 405 denote first, second, third, fourth, and fifth switch means (hereinafter simply referred to as "switch means" in some cases) that are, for instance, constructed from mechanical relays and the like, and numerals 406 and 407 respectively represent first and second filter capacitors (hereinafter simply referred to as "filter capacitors" in some cases) for absorbing ripple currents due to the switching of transistors 200 and 201 and the switching of transistors 202 and 203. Also, although not illustrated, a control apparatus is connected to each of the switch means 401 to 405 and the transistors 200 to 203, with the control apparatus controlling the opening/closing of each of the switch means 401 to 405 and the turning on/off of each of the transistors 200 to 203.

The first and second switch means 401 and 402 are respectively connected between a first AC power supply 112 and a first reactor 208 and between a second AC power supply 113 and a second reactor 209. The third switch means 403 is connected between a connection point between the first switch means 401 and the first reactor 208, and a connection point between the second reactor 209 and the series body of a second switching means.

Also, the fourth switch means 404 is connected between a connection point between the second switch means 402 and the second reactor 209, and an interconnection point between the capacitors 116 and 117.

Also, a series body of the fifth switch means 405 and the first filter capacitor 406 is connected between a connection point between the third switch mans 403 and the first reactor 208, and an interconnection point between the capacitors 116 and 117, and the second filter capacitor 407 is connected between a connection point between the fourth switch means 404 and the second reactor 209, and an interconnection point between the capacitors 116 and 117.

Next, an operation of this power conversion apparatus will be described. In the case where the AC power supplies 112 and 113 operate normally, the switch means 401, 402, and 405 are turned on and the switch means 403 and 404 are turned off by the control apparatus. Like in the case of the first embodiment, currents of the reactors 208 and 209 are controlled so that the power factors of currents flowing to the AC power supplies 112 and 113 become one, and AC/DC conversion is performed. In this manner, capacitors 116 and 117 are charged and the filter capacitors 406 and 407 respectively absorb high-frequency currents flowing to the reactors 208 and 209.

When an abnormality, such as a power failure or a momentary voltage drop, occurs in either of the AC power supplies 112 and 113, the switch means 401 and 402 are first turned off by the control apparatus. The switch means 405 is turned off after control to be described later is performed, and the switch means 403 and 404 are turned on after control to be described later is performed.

Figure 12:
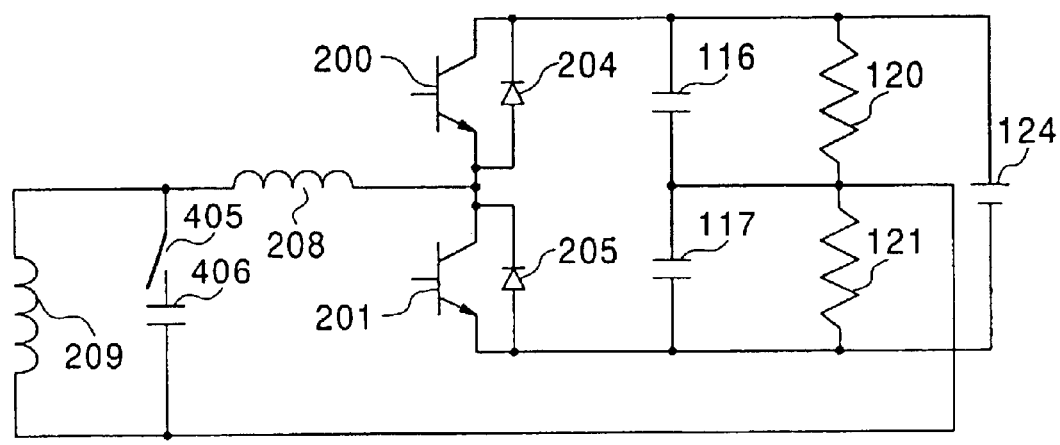
FIG. 12 is an equivalent circuit diagram illustrating an operation performed when an abnormality occurs in an AC power supply in the power conversion apparatus according to the second embodiment.

FIG. 12 shows the final equivalent circuit in the case where an abnormality occurs in the AC power supply 112 or 113. The filter capacitor 406 is disconnected by the switch means 405 and the reactors 208 and 209 are connected in series. In this manner, like in the case of the first embodiment, there is suppressed unbalance between the voltages of the capacitors 116 and 117 even in the case of unbalanced loads.

If a residual voltage exists in the filter capacitor 407 when the switch means 404 is turned on, a steep current flows to the switch means 404 and the switch means 404 is damaged. A means for avoiding this situation will be described below.

Figure 13:
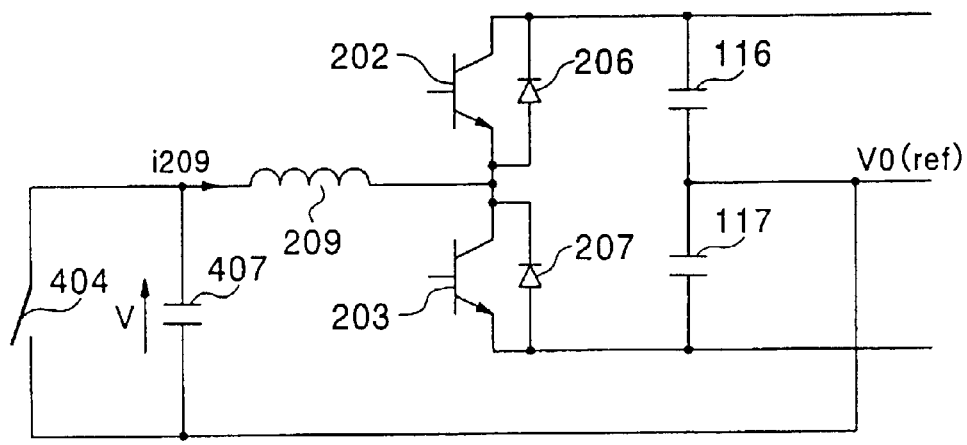

FIG. 13 shows an equivalent circuit under a condition before the switch means 404 and 403 are turned on. To set the voltage V of the filter capacitor 407 to zero, in the control circuit shown in FIG. 14, proportional control using a gain K is performed to set the current i209 flowing to the reactor 209 to zero. The switching of the transistors 202 and 203 is controlled to follow a voltage instruction V* that is an output of the proportional control. As a result, the voltage V described above moves so as to become V*.

Figure 14:
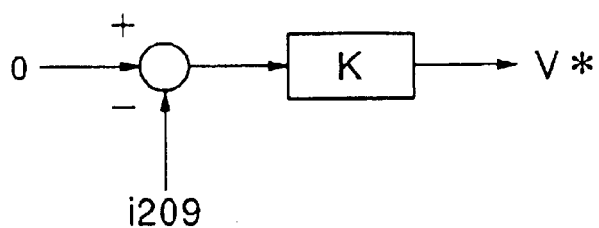
FIG. 14 is a circuit diagram illustrating a control circuit that controls a reactor current in the equivalent circuit in FIG. 13 according to the second embodiment.

As shown in FIG. 14, an instruction value of i209 is zero under a condition where such control is performed, so that the average value of i209 becomes zero. Accordingly, V* also becomes zero and V also becomes zero. Because i209 is zero, the average value of a voltage in the reactor 209 also becomes zero. Consequently, both of the voltages at both ends of the filter capacitor 407 become zero and the average value of the voltage of the filter capacitor 407 becomes zero.

Also, as to the turning off of the switch means 405, with a construction that is the same as the control circuit shown in FIG. 13, the switch means 405 is turned off under a condition where the current i208 flowing to the reactor 208 is set to zero.

Figure 15:
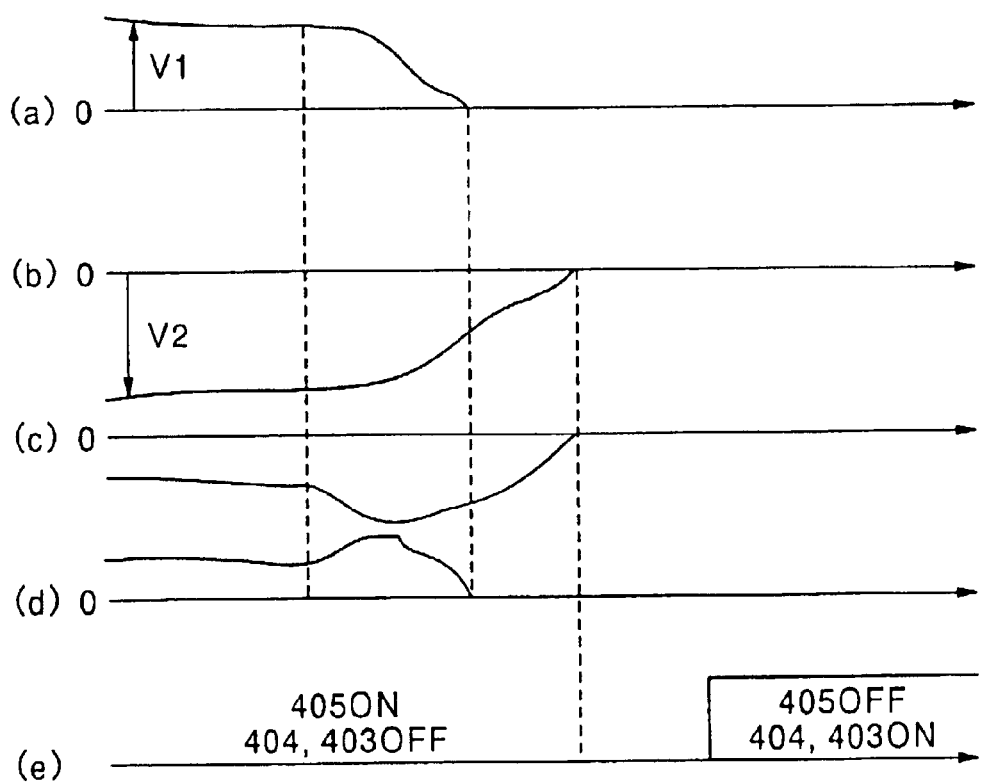
FIG. 15 is a drawing illustrating a time chart of control of each switch means according to the second embodiment.

FIG. 15 is a time chart concerning the control described above. FIG. 15(a) shows a voltage waveform of the capacitor 407, FIG. 15(b) shows a voltage waveform of the capacitor 406, FIG. 15(c) shows a current waveform of the reactor 208, FIG. 15(d) shows a current waveform of the reactor 209, and FIG. 15(e) shows an operation of the switch means. The waveforms in these drawings show only average values and there is omitted ripple currents due to the switching of the transistors. In these drawings, there is shown a case where currents remain in the reactors 208 and 209 when an abnormality occurs in the AC power supply 112 or 113. As a result of the control shown in FIG. 14, an initial voltage V1 of the filter capacitor 407 becomes zero. Also, in a like manner, the current i208 flowing to the reactor 208 becomes zero. Following this, the switch means 404 and 403 are turned on and the switching means 405 is turned off. Accordingly, no steep current is generated by the discharging of the filter capacitor 407 when the switch means 404 is turned on, which prevents a situation where the switch means 404 is damaged.

Figure 16:
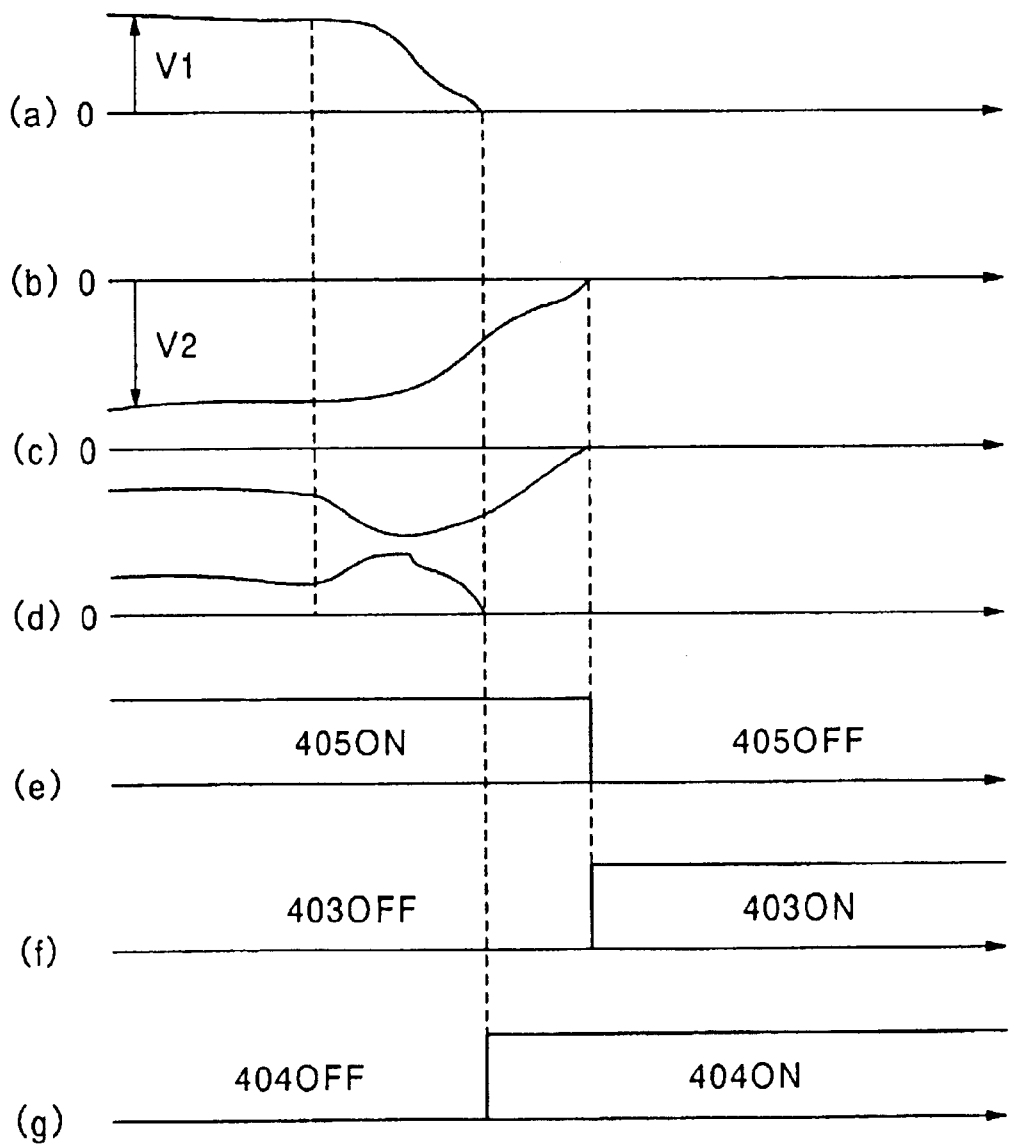
FIG. 16 is a drawing illustrating another time chart of the control of each switch means according to the second embodiment.

It should be noted here that in FIG. 15, at an arbitrary time after both of the voltages of the filter capacitors 406 and 407 become zero, the switch means 403 to 405 are switched at the same time. However, as shown in FIG. 16, the switch means 403 to 405 may be individually switched. FIG. 16(a) shows a voltage waveform of the capacitor 407, FIG. 16(b) shows a voltage waveform of the capacitor 406, FIG. 16(c) shows a current waveform of the reactor 208, FIG. 16(d) shows a current waveform of the reactor 209, and FIGS. 16(e) to 16(g) each show an operation of the switch means. The waveforms in these drawings show only average values and there are omitted ripple currents due to the switching of the transistors. That is, there is obtained the same effect even if the switch means 405 is switched after the current of the reactor 208 becomes zero, the switch means 404 is switched after the voltage of the filter capacitor 407 becomes zero, and the switch means 403 is switched after both of the current of the reactor 208 and the voltage of the filter capacitor 407 become zero.

Figure 17:
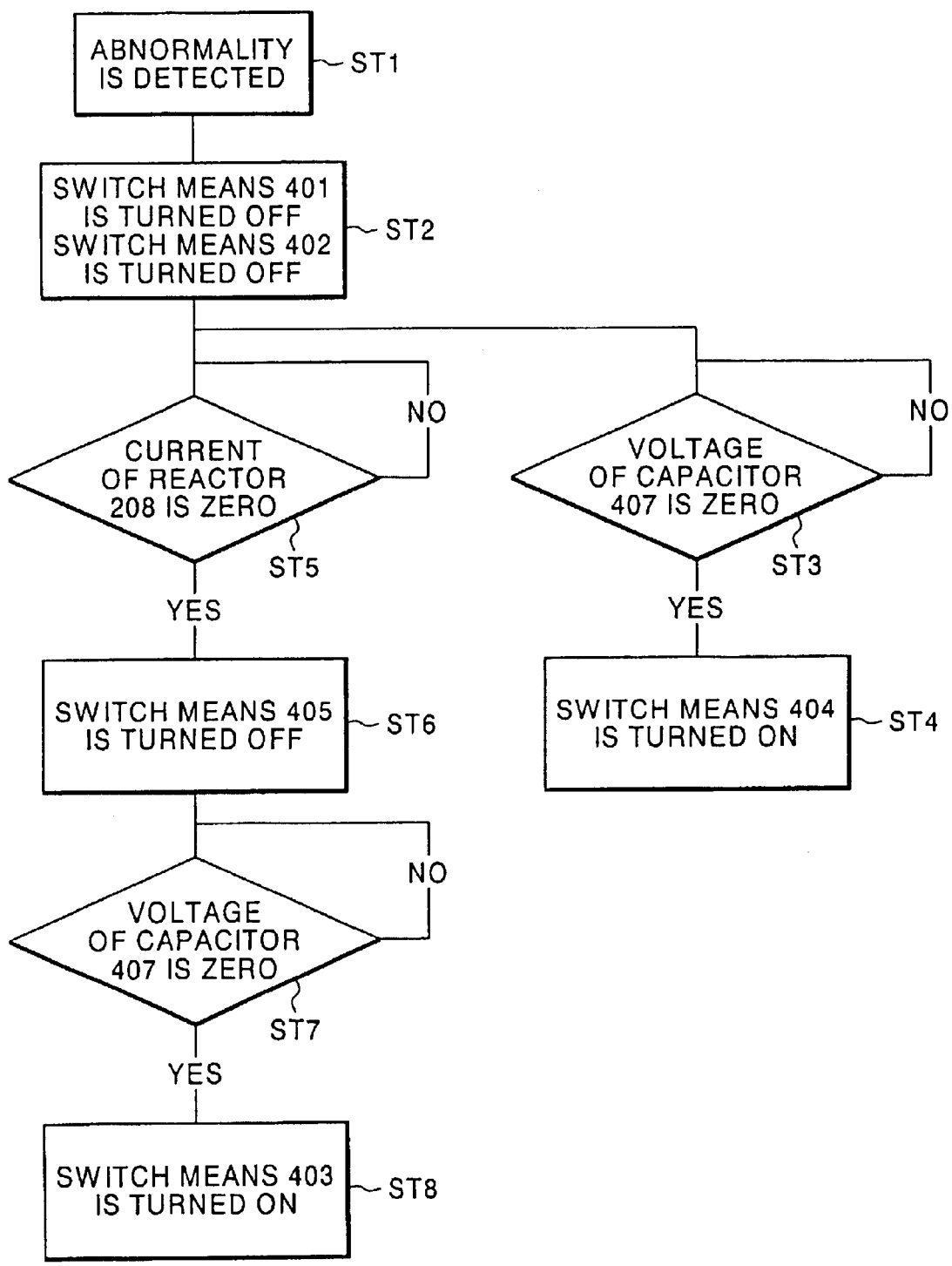
FIG. 17 is a flowchart illustrating an example of the control of each switch means according to the second embodiment.

FIG. 17 is a flowchart obtained by summarizing flowcharts concerning control of each switch means. For instance, when the control apparatus constructed from a microcomputer and the like detects that an abnormality occurs in the AC power supply (step ST1), the apparatus turns off the switch means 401 and 402 (step ST2). Next, when detecting that the voltage of the capacitor 407 becomes zero as a result of the aforementioned control (step ST3), the control apparatus turns on the switch means 404 (step ST4). Also, when detecting that the current of the reactor 208 becomes zero as a result of the aforementioned control (step ST5), the control apparatus turns off the switch means 405 (step ST6). Further, when detecting that the voltage of the capacitor 407 becomes zero (step ST7), the control apparatus turns on the switch means 403 (step ST8).

It should be noted here that in this embodiment, there has been described a case where a current remains in the reactor 208 when an abnormality occurs in the AC power supply 112 or 113. However, in the case where no current remains therein, the switch means 405 may be turned off concurrently with the occurrence of the abnormality of the AC power supply 112 or 113.

As described above, with the technique of this embodiment, even in the case where there are connected the filter capacitors 406 and 407 for absorbing ripple currents, a steep current is not caused by a situation where electric charges remaining in the filter capacitor 407 are shirt-circuited by the switch means 404. As a result, it is possible to circumvent a problem that the switch means 404 is damaged. Also, the switch means 405 is turned off by setting the current of the reactor 208 to zero, so that there is circumvented a problem that the switch means 405 is damaged by energy accumulated in the reactor 208 when the switch means 405 is turned off.

Also, it is possible to balance the voltages of the two capacitors 116 and 117 by halving the voltages applied to the reactors 208 and 209. Consequently, it becomes possible to obtain a stable AC/DC conversion operation and also to obtain a power conversion apparatus where the ripples of currents of the reactors 208 and 209 caused by the switching of the transistors 200 and 201 are reduced to one-half and there are reduced losses and noises.

It should be noted here that in this embodiment, there has been described the single-phase three-wire system as an example. However, needless to say, it is possible to obtain the same construction and to achieve the same effect even in the case of a three-phase four-wire system shown in FIG. 10 or an n-phase n+1-wire system ($n \geq 4$).

(Third Embodiment)

Figure 18:
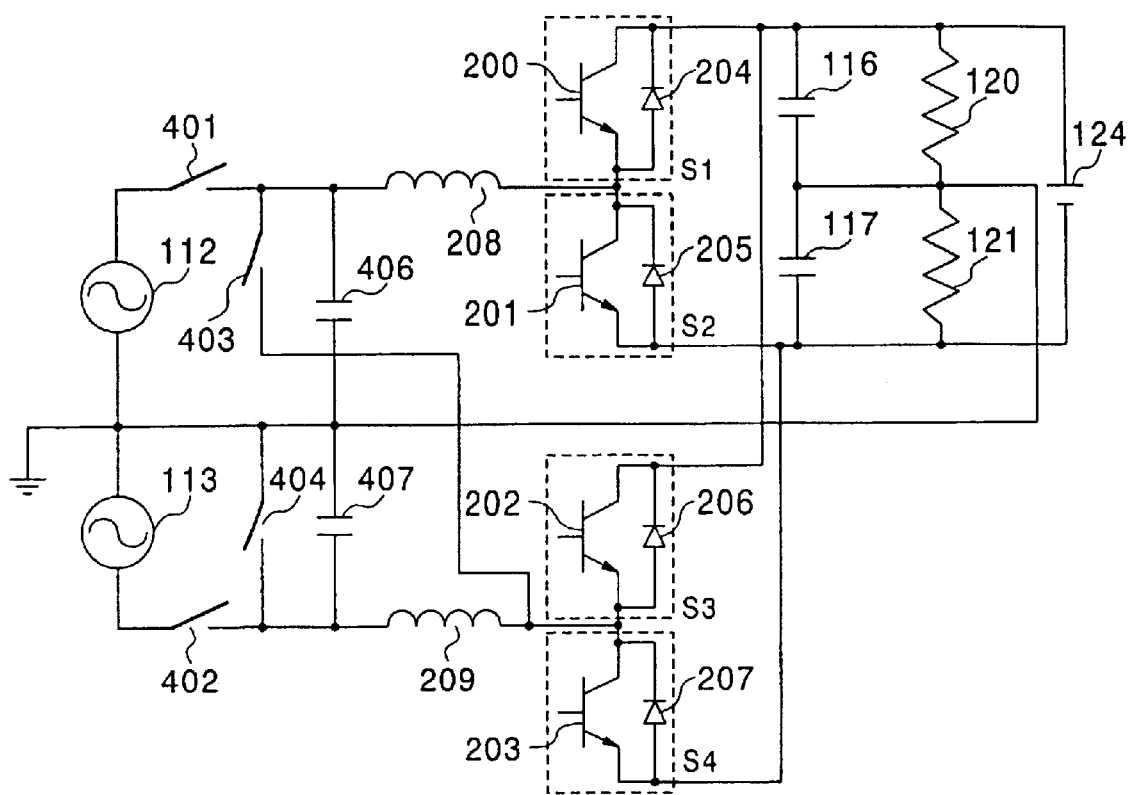
FIG. 18 is a circuit diagram illustrating a circuit construction of a power conversion apparatus according to a third embodiment.

FIG. 18 is a circuit diagram showing a power conversion apparatus according to the third embodiment of the present invention. In this embodiment, to realize cost reduction, the fifth switch means 405 of the second embodiment is omitted and only the first filter capacitor 406 is connected between the connection point between the third switch means 403 and the first reactor 208, and the interconnection point between the capacitors 116 and 117. Other constructions are the same as those in the second embodiment.

Next, an operation of this power conversion apparatus will be described. In the case where the AC power supplies 112 and 113 operate normally, the switch means 401 and 402 are turned on and the switch means 404 and 403 are turned off. Like in the case of the second embodiment shown in FIG. 11, AC/DC conversion is performed by controlling the currents of the reactors 208 and 209 so that the power factors of the currents flowing to the AC power supplies 112 and 113 become one. In this manner, the capacitors 116 and 117 are charged and the filter capacitors 406 and 407 respectively absorb high-frequency currents flowing to the reactors 208 and 209.

When an abnormality, such as a power failure or a momentary voltage drop, occurs in either of the AC power supplies 112 and 113, the switch means 401 and 402 are first turned off by a control apparatus and the switch means 404 and 403 are turned on after control to be described later is performed.

Figure 19:
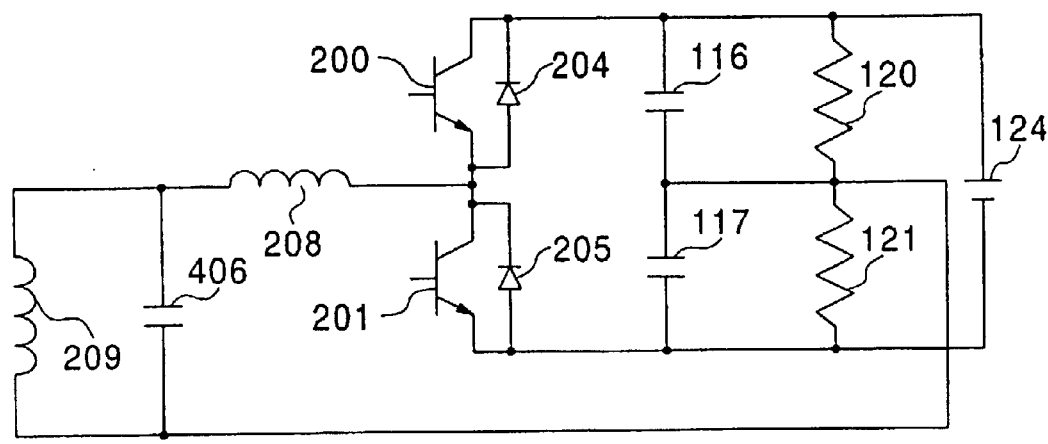
FIG. 19 is an equivalent circuit diagram illustrating an operation performed when an abnormality occurs in an AC power supply in the power conversion apparatus according to the third embodiment.

The final equivalent circuit in the case where an abnormality occurs in the AC power supply 112 or 113 is shown in FIG. 19. A parallel connection body of the reactor 209 and the filter capacitor 406 is connected to the reactor 208 in series, which means that an impedance is connected to the reactor 208 in series. As a result, the ripple current flowing to the reactor 208 is reduced in comparison with the case shown in FIG. 26.

By the way, in FIG. 18, if a residual voltage exists in the filter capacitor 407 when the switch means 404 is turned on, a steep current flows to the switch means 404 and this switch means 404 is damaged. A means for circumventing this situation is the same as that described in the second embodiment and therefore is not described in this embodiment. Also, if a residual voltage exists in the filter capacitor 406 when the switch means 403 is turned on, unnecessary resonance is generated between the reactor 209 and the filter capacitor 406 in FIG. 19, which results in energy losses. A means for circumventing this problem will be described below.

Figure 20:
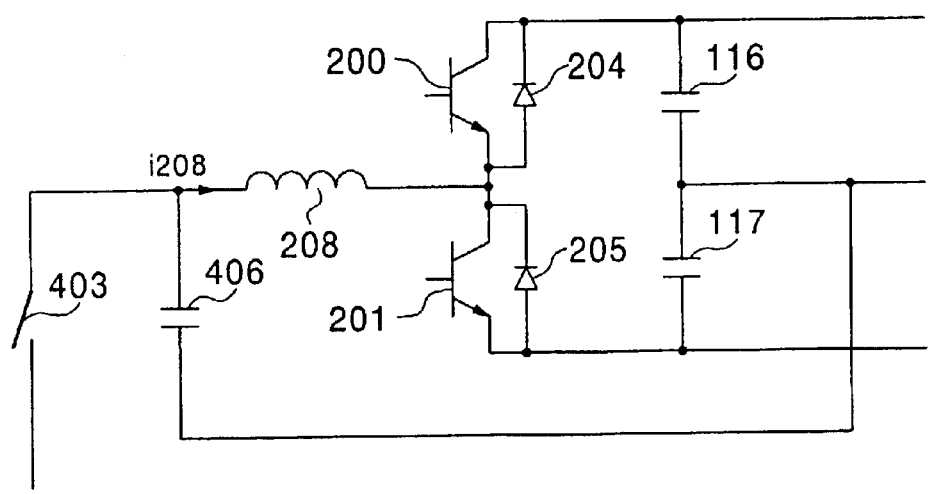
FIG. 20 is a circuit diagram illustrating control of a current flowing to a reactor according to the third embodiment.

In FIG. 20, before the switch means 403 is turned on, the transistors 200 and 201 are controlled by a control circuit that is the same as that shown in FIG. 14 so that the current i208 flowing to the reactor 208 becomes zero. Accordingly, as a result of an operation that is the same as that in the second embodiment, the voltage of the filter capacitor 406 becomes zero.

FIGS. 21(a) to (e) show voltages of the filter capacitors 406 and 407, waveforms of i208 and i209, and an operation of the switch means. FIG. 21(a) shows a voltage waveform of the capacitor 407, FIG. 21(b) shows a voltage waveform of the capacitor 406, FIG. 21(c) shows a current waveform of the reactor 208, FIG. 21(d) shows a current waveform of the reactor 209, and FIG. 21(e) shows the operation of the switch means are operated. The waveforms in these drawings show only average values and there are omitted ripple currents caused by the switching of the transistors. By a control circuit that is the same as that in FIG. 14 described above, the initial values V1 and V2 of the capacitors 406 and 407 become zero and the switch means 404 and 403 are turned on, thereby obtaining the construction shown in FIG. 19 and balancing the voltages of the capacitors 116 and 117.

Figure 21:
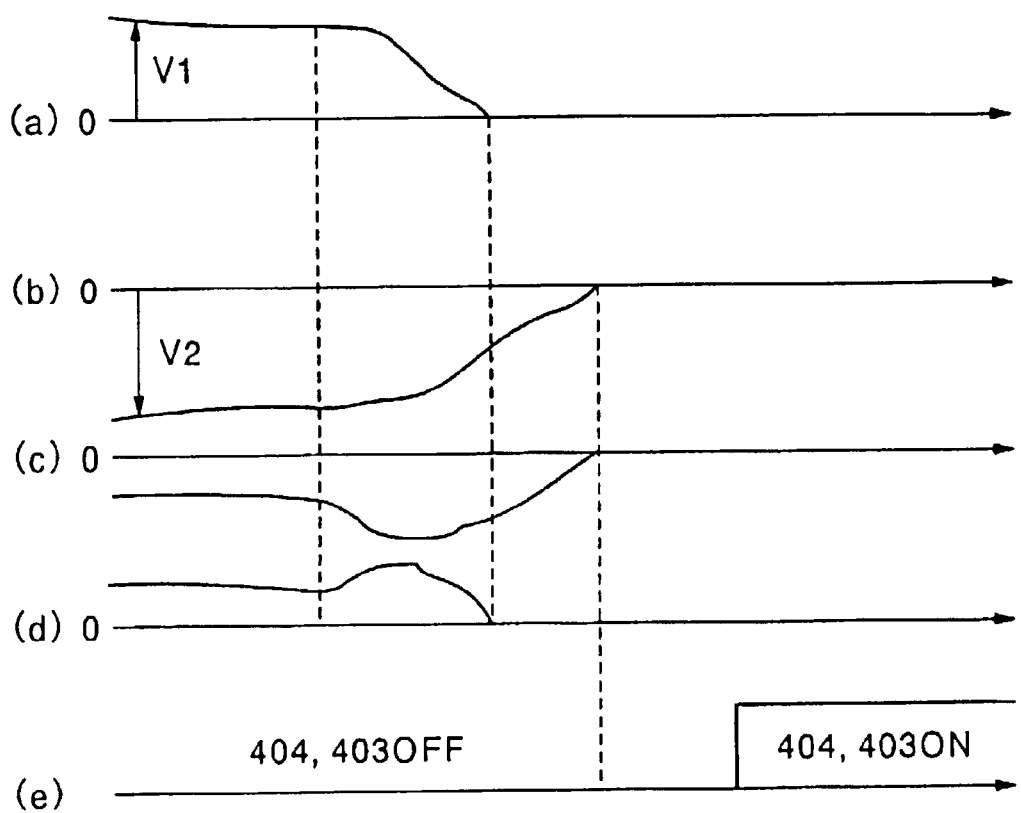
FIG. 21 is a drawing illustrating a time chart of control of each switch means according to the third embodiment.
Figure 22:
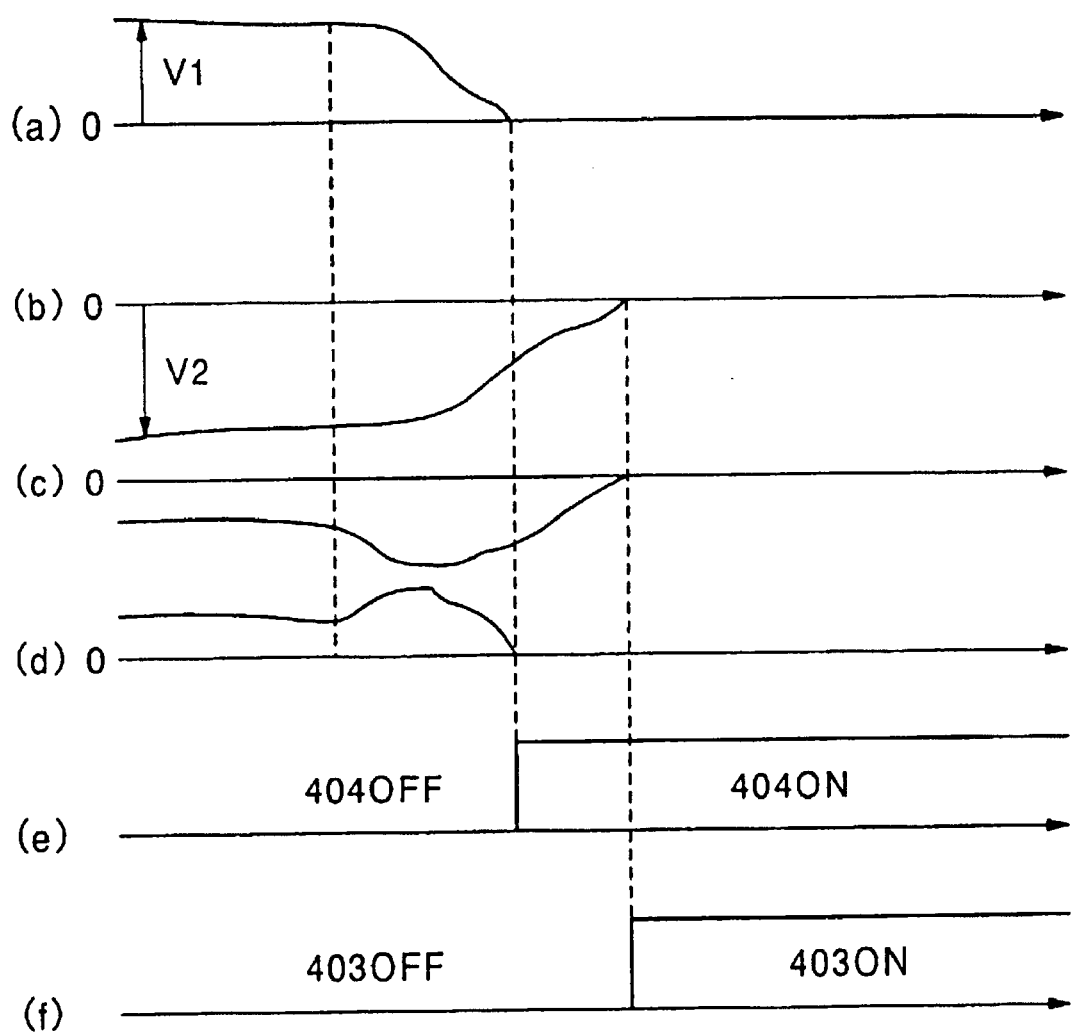
FIG. 22 is a drawing illustrating another time chart of the control of each switch means according to the third embodiment.

It should be noted here that in FIG. 21, at an arbitrary time after both of the voltages of the filter capacitors 406 and 407 become zero, the switch means 403 and 404 are switched at the same time. However, as shown in FIG. 22, the switch means 403 and 404 may be individually switched. That is, there is obtained the same effect even if the switch means 403 is switched after the voltage of the filter capacitor 406 becomes zero and the switch means 404 is switched after the voltage of the filter capacitor 407 becomes zero. FIG. 22(a) shows a voltage waveform of the capacitor 407, FIG. 22(b) shows a voltage waveform of the capacitor 406, FIG. 22(c) shows a current waveform of the reactor 208, FIG. 22(d) shows a current waveform of the reactor 209, FIG. 22(e) shows an operation of the switch means 404, and FIG. 22(f) shows an operation of the switch means 403. The waveforms in these drawings show only the average values and there are omitted ripple currents due to the switching of the transistors.

Figure 23:
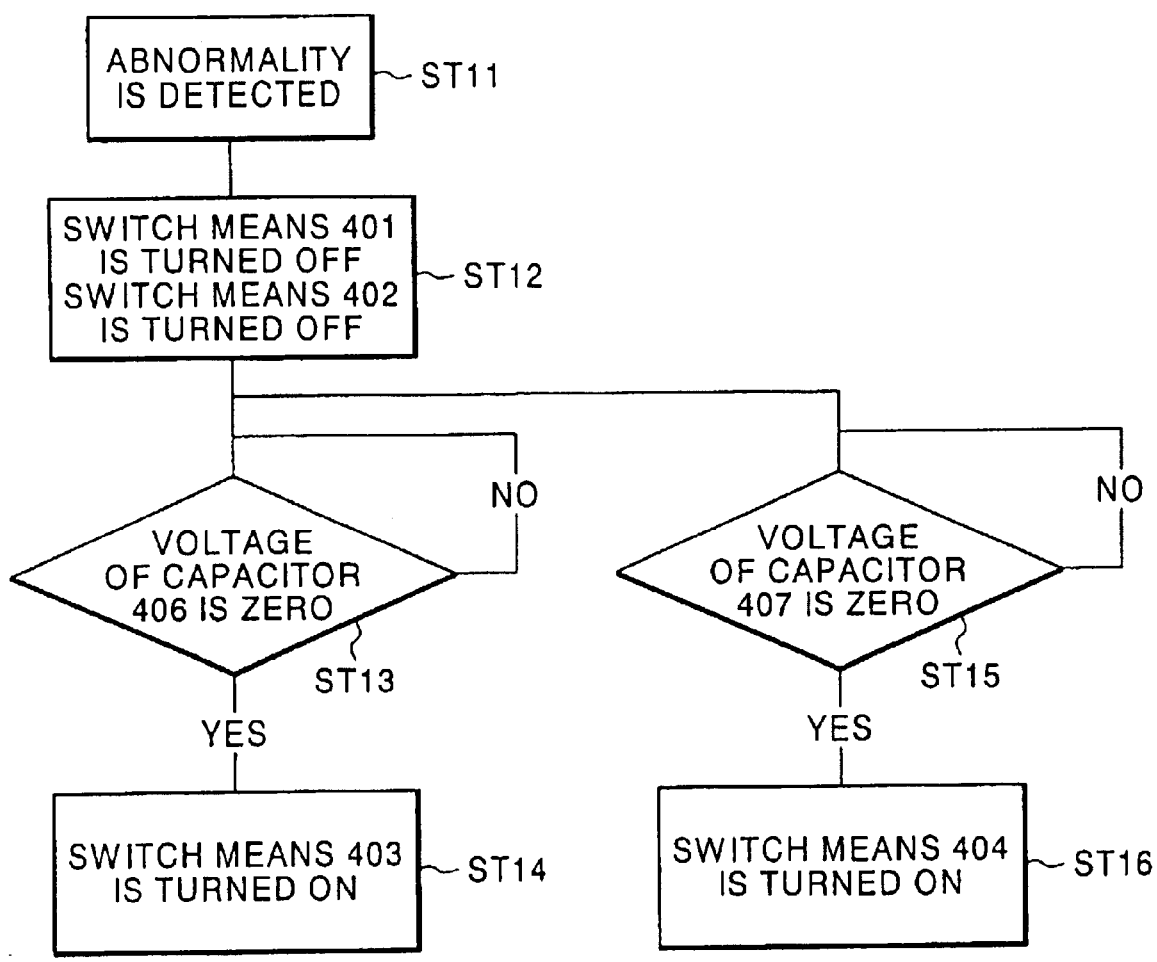
FIG. 23 is a flowchart illustrating an example of the control of each switch means according to the third embodiment.
Figure 24:
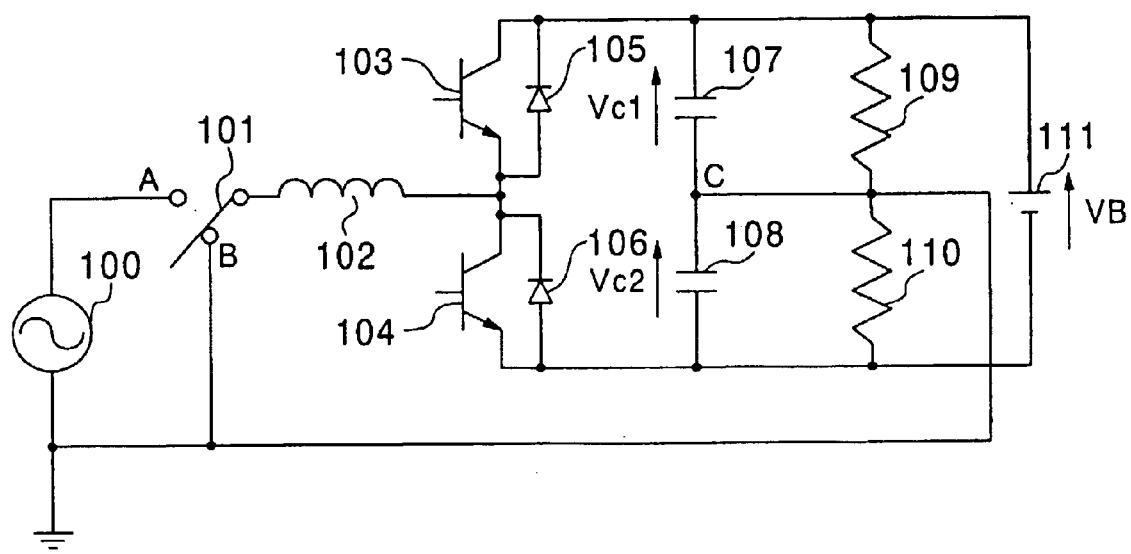
FIG. 24 is a circuit diagram illustrating a conventional power conversion apparatus.
Figure 25:
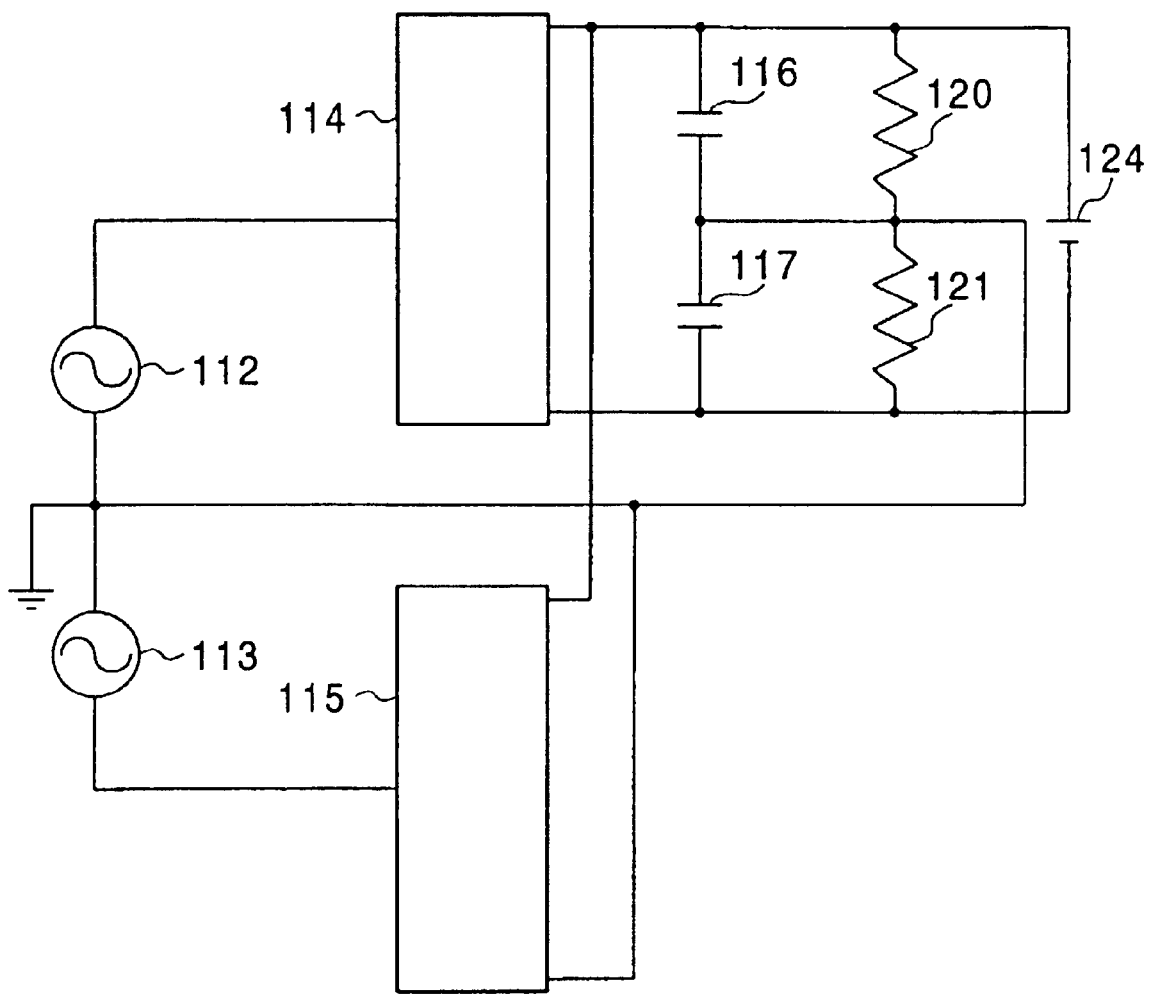
FIG. 25 is a circuit diagram illustrating a main circuit construction of a power conversion apparatus in the case of a single-phase three-wire system AC power supply.

When flowcharts concerning control of respective switch means during this operation are summarized, there is obtained the flowchart shown in FIG. 23. For instance, when a control apparatus constructed from a microcomputer and the like detects that an abnormality occurs in the AC power supply (step ST11), the apparatus turns off the switch means 401 and 402 (step ST12). Next, when detecting that the voltage of the capacitor 406 becomes zero as a result of the aforementioned control (step ST13), the control apparatus turns on the switch means 403 (step ST14). Also, when detecting that the voltage of the capacitor 407 becomes zero as a result of the aforementioned control (step ST15), the control apparatus turns on the switch means 404 (step ST16).

As described above, with the technique of this embodiment, in the case where there are connected the filter capacitors 406 and 407 for absorbing ripple currents, even if the switch means 405 of the second embodiment is omitted for cost reduction, a steep current is not caused by a situation where electric charges remaining in the filter capacitor 407 are shirt-circuited by the switch means 404. As a result, it is possible to circumvent a problem that the switch means 404 is damaged. Also, it is possible to prevent the occurrence of unnecessary resonance between the filter capacitor 406 and the reactor 209 and there are suppressed energy losses due to the resonance.

Also, the parallel connection body of the reactor 209 and the filter capacitor 406 is connected to the reactor 208 in series, which means that that an impedance is connected to the reactor 208 in series. As a result, it becomes possible to reduce the ripple current flowing to the reactor 208 in comparison with the case shown in FIG. 26 and to reduce losses and noises.

Also, it is possible to balance the voltages of the two capacitors 116 and 117, which makes it possible to obtain a stable AC/DC conversion operation.

It should be noted here that in this embodiment, the single-phase three-wire system has been described as an example. However, needless to say, it is possible to obtain the same construction and to achieve the same effect even in the case of a three-phase four-wire system shown in FIG. 10 or an n-phase n+1-wire system (n≧4).

INDUSTRIAL APPLICABILITY

It is possible to use the power conversion apparatus of the present invention as a power conversion apparatus, such as an uninterruptible power supply capable of supplying power to a load even if an abnormality, such as a power failure or a momentary voltage drop, occurs in a system power supply.

What is claimed is:

1. A power conversion apparatus comprising:

first AC/DC conversion means including a first AC power supply, a first reactor, and first switching means, connected in series;

a second AC/DC conversion means including a second AC power supply, a second reactor, and second switching means, connected in series;

two capacitors connected in series, an interconnection point of the two capacitors being connected to a first terminal of each of the first and second AC power supplies, and the two capacitors receiving energy supplied by DC voltages produced by the first and second AC/DC conversion means;

a load connected to the two capacitors;

a battery connected to the two capacitors; and first switch means connected between the first AC power supply and the first reactor, connecting the first reactor to the first AC power supply if the first and second AC power supplies operate normally, and connecting the first reactor to a connection point between the second reactor and the second switching means if one of the first and second AC power supplies operates abnormally;

second switch means connected between the second AC power supply and the second reactor, connecting the second reactor to the second AC power supply if the first and second AC power supplies operate normally, and connecting the first reactor and the second reactor in series by connecting the second reactor to an interconnection point between the two capacitors if one of the first and second AC power supplies operates abnormally; and a control apparatus that controls a voltage difference between the two capacitors, wherein, if the first and second AC power supplies operate normally, the control apparatus controls a current flowing to the first reactor using the first switching means to perform AC/DC conversion and controls a current flowing to the second reactor using the second switching means to perform AC/DC conversion, and if one of the first and second AC power supplies operates abnormally, the control apparatus controls the battery to supply energy to the two capacitors and controls the current flowing to the first reactor using the first switching means.

2. A power conversion apparatus comprising:

first AC/DC conversion means including a first AC power supply, a first reactor, and first switching means, connected in series;

second AC/DC conversion means including a second AC power supply, a second reactor, and second switching means, connected in series;

two capacitors connected in series, an interconnection point of the two capacitors being connected to a first terminal of each of the first and second AC power supplies, and the two capacitors receiving energy supplied by DC voltages produced by the first and second AC/DC conversion means;

a load that is connected to the two capacitors;

a battery connected to the two capacitors first switch means connected between the first AC power supply and the first reactor;

second switch means connected between the second AC power supply and the second reactor;

third switch means connected between a connection point between the first switch means and the first reactor, and a connection point between the second reactor and the second switching means;

fourth switch means that is connected between a connection point between the second switch means and the second reactor, and an interconnection point between the capacitors;

a series body including fifth switch means and a first filter capacitor connected between a connection point between the third switch means and the first reactor, and an interconnection point between the two capacitors;

a second filter capacitor connected between a connection point between the fourth switch means and the second reactor, and an interconnection point between the two capacitors; and a control apparatus that controls a voltage difference between the two capacitors, wherein, if the first and second AC power supplies operate normally, the control apparatus turns on the first switch means, the second switch means, and the fifth switch means and turns off the third switch means and the fourth switch means, so that a current flowing to the first reactor is controlled using the first switching means to perform AC/DC conversion, a high-frequency current flowing to the first reactor is absorbed using the first filter capacitor, a current flowing to the second reactor is controlled using the second switching means to perform AC/DC conversion, and a high-frequency current flowing to the second reactor is absorbed using the second filter capacitor, and if one of the first and second AC power supplies operate abnormally, the control apparatus turns off the first switch means and the second switch means, sets a voltage of the second filter capacitor to approximately zero through switching of the second switching means, sets a current of the first reactor to approximately zero through switching of the first switching means, turns on the third switch means and the fourth switch means, turns off the fifth switch means, connects the first reactor to a connection point between the second reactor and the second switching means, and connects the first reactor to the second reactor in series, so that energy is supplied to the two capacitors from the battery and a current flowing to the first reactor is controlled using the first switching means.

3. A power conversion apparatus comprising:

first AC/DC conversion means including a first AC power supply, a first reactor, and first switching means, connected in series;

second AC/DC conversion means including a second AC power supply, a second reactor, and second switching means, connected in series;

two capacitors connected in series, an interconnection point of the two capacitors being connected to a first terminal of each of the first and second AC power supplies, and the two capacitors receiving energy supplied by DC voltages produced by the first and second AC/DC conversion means;

a load that is respectively connected to the two capacitors;

a battery connected to the two capacitors first switch means connected between the first AC power supply and the first reactor;

second switch means connected between the second AC power supply and the second reactor;

third switch means connected between a connection point between the first switch means and the first reactor, and a connection point between the second reactor and the second switching means;

fourth switch means connected between a connection point between the second switch means and the second reactor, and an interconnection point between the two capacitors;

a first filter capacitor connected between a connection point between the third switch means and the first reactor, and an interconnection point between the two capacitors;

a second filter capacitor connected between a connection point between the fourth switch means and the second reactor, and an interconnection point between the two capacitors; and a control apparatus that controls a voltage difference between the two capacitors, wherein, if the first and second AC power supplies operate normally, the control apparatus turns on the first switch means and the second switch means and turns off the third switch means and the fourth switch means, so that a current flowing to the first reactor is controlled using the first switching means to perform AC/DC conversion, a high-frequency current flowing to the first reactor is absorbed using the first filter capacitor, a current flowing to the second reactor is controlled using the second switching means to perform AC/DC conversion, and a high-frequency current flowing to the second reactor is absorbed using the second filter capacitor, and if one of the first and second AC power supplies operate abnormally, the control apparatus turns off the first switch means and the second switch means, sets a voltage of the first filter capacitor to approximately zero through switching of the first switching means, sets a voltage of the second filter capacitor to approximately zero through switching of the second switching means, turns on the third switch means and the fourth switch means, connects the first reactor to a connection point between the second reactor and the second switching means, and connects the first reactor in parallel with a series connection of the second reactor and the first filter capacitor, so that energy is supplied to the two capacitors from the battery and a current flowing to the first reactor is controlled using the first switching means.

* * * * *